(12) United States Patent
Tanaka

(10) Patent No.: US 8,696,020 B2
(45) Date of Patent: Apr. 15, 2014

(54) AIRBAG APPARATUS

(75) Inventor: Koki Tanaka, Kiyosu (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 53 days.

(21) Appl. No.: 13/187,590

(22) Filed: Jul. 21, 2011

(65) Prior Publication Data
US 2012/0025498 A1 Feb. 2, 2012

(30) Foreign Application Priority Data
Jul. 30, 2010 (JP) ................................. 2010-172801

(51) Int. Cl.
*B60R 21/206* (2011.01)
*B60R 21/231* (2011.01)
*B60R 21/2338* (2011.01)

(52) U.S. Cl.
USPC ..... 280/730.1; 280/732; 280/729; 280/743.2; 280/743.1; 280/728.2

(58) Field of Classification Search
USPC ............. 280/730.1, 730.2, 732, 743.1, 743.2, 280/729, 728.2
See application file for complete search history.

(56) References Cited

U.S. PATENT DOCUMENTS

| | | | | |
|---|---|---|---|---|
| 7,600,784 | B2 * | 10/2009 | Kashiwagi ................... | 280/743.2 |
| 7,766,374 | B2 * | 8/2010 | Abele et al. ................. | 280/730.1 |
| 8,096,578 | B2 * | 1/2012 | Wigger et al. ................ | 280/732 |
| 2005/0062265 | A1 * | 3/2005 | Hotta et al. ................. | 280/730.1 |
| 2005/0151351 | A1 * | 7/2005 | Enders et al. ............... | 280/730.1 |
| 2005/0189741 | A1 * | 9/2005 | Abe et al. ................... | 280/730.1 |
| 2009/0058052 | A1 * | 3/2009 | Ford et al. .................. | 280/730.1 |
| 2009/0085333 | A1 * | 4/2009 | Imaeda et al. .............. | 280/730.1 |
| 2010/0270780 | A1 * | 10/2010 | Moritani ..................... | 280/730.1 |
| 2011/0049847 | A1 * | 3/2011 | Adachi et al. .............. | 280/730.1 |

FOREIGN PATENT DOCUMENTS

| | | |
|---|---|---|
| JP | 2003-220920 A | 8/2003 |
| JP | 2004-352012 A | 12/2004 |
| JP | A-2004-352012 | 12/2004 |
| JP | 2005-096576 A | 4/2005 |
| JP | 2006-142964 A | 6/2006 |
| JP | 2006-206049 A | 8/2006 |

(Continued)

OTHER PUBLICATIONS

Office Action mailed Sep. 17, 2013 in corresponding JP Application No. 2010-172801 (and English translation).

*Primary Examiner* — Ruth Ilan
*Assistant Examiner* — George Spisich
(74) *Attorney, Agent, or Firm* — Posz Law Group, PLC

(57) ABSTRACT

An airbag apparatus mountable in front of a seat of a vehicle and including an airbag is disclosed. The airbag is deployable between a member of a vehicle body structure and knees of a vehicle occupant. The airbag includes a bag body formed by connecting peripheral edges of a vehicle body side wall and an occupant side wall, an outer connecting element that is located on an outer face of the vehicle body side wall and connected to the vehicle body side wall by two joints arranged away from each other in an up and down direction at deployment for reducing a length in an up and down direction of the vehicle body side wall, and a plurality of thin regions that are arranged between the two joints of the outer connecting element to the vehicle body side wall on the bag body. The thin regions are arranged generally along a left and right direction in a mutually separate fashion and help bend the airbag at deployment.

8 Claims, 22 Drawing Sheets

(56) References Cited

FOREIGN PATENT DOCUMENTS

| | | | |
|---|---|---|---|
| JP | 2009-149277 | A | 7/2009 |
| JP | 2009-292183 | A | 12/2009 |
| JP | 2012-511456 | A | 5/2012 |
| JP | 2012-192871 | A | 10/2012 |
| WO | 2010/066323 | A1 | 6/2010 |

\* cited by examiner

AIRBAG APPARATUS

The Present application claims priority from Japanese Patent Application No. 2010-172801 of Tanaka, filed on Jul. 30, 2010, the disclosure of which is hereby incorporated into the present application by reference.

BACKGROUND OF THE INVENTION

1. Field of the Invention

The present invention relates to an airbag apparatus including an airbag for knee protection which is fabricated of flexible material and is housed in a folded-up state inside a housing located in front of a vehicle occupant seated in a seat for covering front faces of knees of the occupant upon deployment.

2. Description of Related Art

JP 2004-352012 discloses an airbag apparatus including an airbag for knee protection. The airbag is formed by connecting peripheral edges of two panels formed into generally identical contours; a vehicle body side panel deployable toward the vehicle body structure and an occupant side panel deployable toward a seat. The vehicle body side panel is provided on the outer face (i.e., on the front face) with an outer connecting element which is used to shorten the length of the vehicle body side panel in an up and down (a front and rear) direction. The outer connecting element helps shorten the length of the vehicle body side panel in an up and down direction compared to that of the occupant side panel upon airbag deployment, thereby helping the airbag deploy along the rear face of the vehicle body structure which has such a curved shape that its middle region in an up and down direction protrudes rearward.

However, the above known airbag is merely designed to shorten the length of the vehicle body side panel in an up and down direction than that of the occupant side panel by providing the outer connecting element on the outer face of the vehicle body side panel. An improvement has been desired for deploying an airbag even more smoothly along the vehicle body structure.

SUMMARY OF THE INVENTION

An object of the present invention is to provide an airbag apparatus which includes an airbag for knee protection which is deployable along a curved rear face of a vehicle body structure smoothly for steady protection of knees of an occupant.

The object of the invention will be achieved by the following airbag apparatus:

The airbag apparatus includes an airbag for knee protection, a housing adapted to be mounted in front of a seat of the vehicle for housing the airbag, and an inflator for supplying the airbag with an inflation gas.

The airbag for knee protection is made of a flexible material and housed in the housing in a folded-up state for emergence from the housing and deployment between a member of a vehicle body structure and knees of a vehicle occupant when fed with the inflation gas by the inflator, so as to cover a rear face of the member of the vehicle body structure which is so curved that a middle region of the member in an up and down direction protrudes rearward.

The airbag includes:

a bag body formed by connecting peripheral edges of a pair of walls that are generally identical in outer contour, the walls being a vehicle body side wall deployable toward the vehicle body structure and an occupant side wall deployable toward the seat;

an outer connecting element that is located on an outer face of the vehicle body side wall and connected to the vehicle body side wall by two joints arranged away from each other in an up and down direction at deployment for reducing a substantial length in an up and down direction of the vehicle body side wall at deployment compared to that in a flattened and noninflated state;

a mounting region to the housing, located on either an upper or a lower end region of the bag body; and a plurality of thin regions that are formed by approximating the vehicle body side wall and occupant side wall so as to remain thin even at airbag inflation, the thin regions being arranged generally along a left and right direction in a mutually separate fashion in an area of the bag body between the two joints of the outer connecting element to the vehicle body side wall, thereby helping bending of the airbag at deployment.

In the airbag apparatus thus designed, the bag body includes the thin regions that remain thin even at airbag inflation by keeping the vehicle body wall and occupant side wall approximated. The thin regions will help bend the bag body upon deployment at their location. Further, the outer connecting element is located on the outer face of the vehicle body side wall and connected to the vehicle body side wall by the two joints arranged away from each other in an up and down direction at deployment so as to reduce the length in an up and down direction of the vehicle body side wall, and the thin regions are located between the two joints of the outer connecting element to the vehicle body side wall. Upon airbag deployment, the outer connecting element will pull the leading end of the bag body toward the housing to which the opposite end of the bag body, i.e., the mounting region, is secured, such that the bag body will deploy in a bowing fashion with the leading end oriented toward the member of the vehicle body structure. Moreover, the thin regions are arranged generally along a left and right direction of the bag body in a mutually separate manner. This configuration will help bend the bag body at the location of the thin regions in a steady fashion in a wide range in a left and right direction. Additionally, the separate arrangement of the thin regions will allow an inflation gas flown into an area where the mounting region is located to pass through regions between the thin regions and flow into an area of the bag body from the thin regions to the leading end, thereby helping inflate the whole bag body quickly. As a result, the airbag apparatus of the invention is capable of so deploying the airbag as to cover the rear face of the member of the vehicle body structure smoothly and quickly even if the member of the vehicle body structure has such a curved shape that the middle region in an up and down direction protrudes rearward.

Therefore, the airbag apparatus of the invention is capable of deploying the airbag along the curved rear face of the member of the vehicle body structure smoothly for steady protection of knees of a vehicle occupant.

In the airbag apparatus thus configured, it is desired that:

the mounting region is located at the lower end region of the bag body such that the bag body is deployable upward after emerging from the housing mounted at a low site in front of the knees;

a cushioning region for cushioning the knees is located in an upper area of the bag body, the cushioning region being greater in width in a left and right direction than the mounting region, such that the bag body in a flattened and noninflated state has a shape like a home plate; and the thin regions are located in an area with a narrow width below the cushioning region.

Since this configuration locates the thin regions out of the cushioning region for protecting knees of an occupant, the cushioning region will be allowed to secure enough thickness, and the cushioning region inflated in a thick and wide fashion will cushion the knees softly.

If, in the airbag apparatus configured as above, each of the thin regions is made by connecting the vehicle body side wall and occupant side wall in such a manner as to bring the walls into contact with each other, the thin regions will remain very thin upon airbag deployment, so that the bag body can bend in a large degree at the location of the thin regions. Moreover, if the thin regions are formed at such locations that are laterally symmetrical relative to the center in a left and right direction of the bag body and are distant from left and right edges of the bag body, the regions in between the thin regions, i.e., the regions that can feed an inflation gas to the area to the leading end of the bag body, are formed on more than one locations including the sides of the left and right edges of the bag body, in a laterally symmetrical fashion. This configuration will help inflate the bag body quickly, in a balanced manner in a left and right direction.

Especially if the number of the thin regions is two, the regions that can feed an inflation gas to the area to the leading end of the bag body will be formed at three locations; at the sides of the left and right edges and generally at the center in a left and right direction of the bag body, thereby quickly inflating a central area in a left and right direction of the bag body as well, and inflating the bag body quickly generally over an entire area in a left and right direction.

Furthermore, if each of the thin regions is formed by connecting the vehicle body side wall and occupant side wall together into a generally oval shape in such a manner as to bring the walls and into contact with each other, each of the thin regions will be wide in a front and rear direction as well as in a left and right direction. This configuration will help prevent stress concentration from occurring at the locations of the thin regions upon inflation of the bag body.

In the airbag apparatus configured as above, if the inflator includes a plurality of mounting members arranged in a left and right direction for mounting on the housing and is housed inside the bag body such that the mounting members protrude out of the vehicle body side wall, it is desired that a first joint out of the two joints of the outer connecting element to the vehicle body side wall, which first joint is located more proximate to the inflator at airbag deployment, is formed by securing either an upper or lower end region of the outer connecting element to the housing together with the bag body by the mounting members of the inflator. With this configuration, one of the upper or lower edge of the outer connecting element has only to be connected to the vehicle body side wall when manufacturing the airbag. This will facilitate the manufacturing of the airbag compared to an instance where both of the upper edge and lower edge of the outer connecting element are connected to the vehicle body side wall with sewing threads or the like.

In this case, it is desired that:

the outer connecting element is comprised of a single sheet material that is greater in width in a left and right direction than that of the housing at least at its area located down the stream of the inflation gas;

a second joint out of the two joints of the outer connecting element to the vehicle body side wall, which second joint is more away from the inflator at airbag deployment, is comprised of a stitch that is formed into a generally straight and continuous line extending generally along a left and right direction and extending outwardly beyond the mounting members in a left and right direction; and opposite end portions of the stitch are so curved that their terminals are headed up the stream of the inflation gas.

In the above configuration, the outer connecting element is greater in width in a left and right direction than the housing and the stitch that forms the second joint of the outer connecting element is greater in a width in a left and right direction than the first joint (i.e., than a distance between the mounting member of the inflator). However, the figure of the stitch will shorten distances between the left and right terminals of the stitch and the mounting member of the inflator and enable the outer connecting element to pull the vehicle body side wall generally uniformly toward the housing by its generally entire area in a left to right direction at an initial stage of inflation of the bag body. Therefore, the bag body is capable of deploying along the rear face of the member of the vehicle body structure quickly and steadily by its generally entire area in a left and right direction.

If the airbag apparatus of the invention further includes on an area to the leading end of the bag body relative to the thin regions a tether that connects the vehicle body side wall and occupant side wall for limiting the thickness of the bag body at full inflation and is arranged generally along a left and right direction, it is desired that, in a flattened and noninflated state of the vehicle body side wall and occupant side wall, a distance in an up and down direction on the vehicle body side wall from an end on the side the mounting region is located to a joint with the tether is smaller than a distance in an up and down direction on the occupant side wall from an end on the side the mounting region is located to a joint with the tether.

Compared to an instance where the above distances are identical in the occupant side wall and vehicle body side wall, the above configuration will lengthen the substantial length of an area of the occupant side wall from the end proximate the mounting region to the tether that can inflate freely in an arcuate fashion, thereby rendering the bag body even more pliable though the bag body is internally provided with the tether.

The invention can be applied to such an airbag apparatus designed to be so mounted proximate the lower end of the member of vehicle body structure that an opening of the housing for airbag emergence faces downward. Although an airbag of such an airbag apparatus once protrudes downward from the housing upon actuation, it will smoothly deploy along a rear face of a member of the vehicle body structure in a head-up manner since it can bend steadily at the location of the thin regions.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
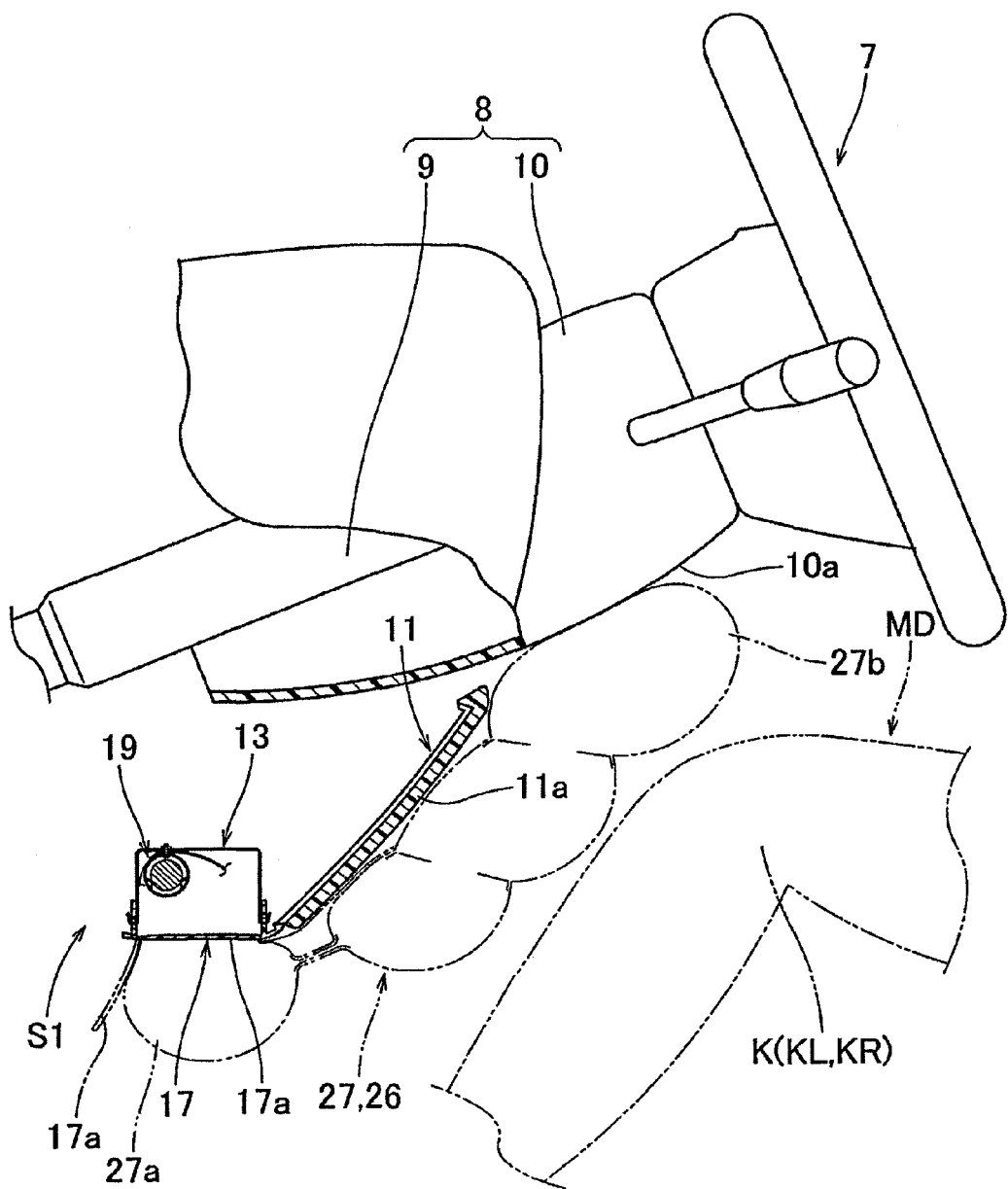
FIG. 1 is a schematic vertical section of an airbag apparatus according to the first embodiment of the invention in a on-board state.
Figure 4:
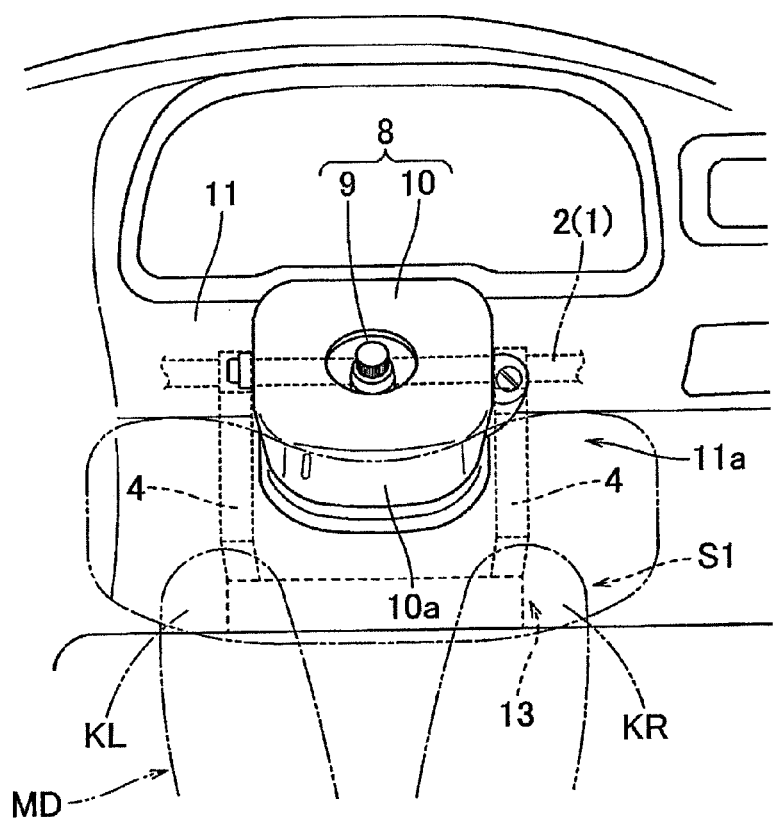
FIG. 4 is a schematic front view of the airbag apparatus of FIG. 1 as viewed from the rear.

As shown in FIGS. 1 and 4, an airbag apparatus S1 according to the first embodiment of the invention is mountable in front of knees K of a driver (occupant) MD seated in a driver's seat and below a column cover 10 which covers a steering column 8. More specifically, the airbag apparatus S1 is to be mounted proximate the front bottom of an instrument panel or dashboard 11 mounted around the column cover 10. Up/down, left/right and front/rear directions in this specification are intended to refer to up/down, left/right and front/rear directions of a vehicle equipped with the airbag apparatus S1.

Referring to FIG. 1, the steering column 8 includes a column body 9 and a column cover 10 that covers the column body 9. The column cover 10 is fabricated of synthetic resin and formed into a generally square tube so located as to protrude rearward from the instrument panel 11 along an axial direction of the column body 9 while covering the column body 9. The rear face 10a of a region of the column cover 10 protruding from the instrument panel 11 is formed into a curved surface ascending rearward in a front and rear direction of the vehicle.

Figure 2:
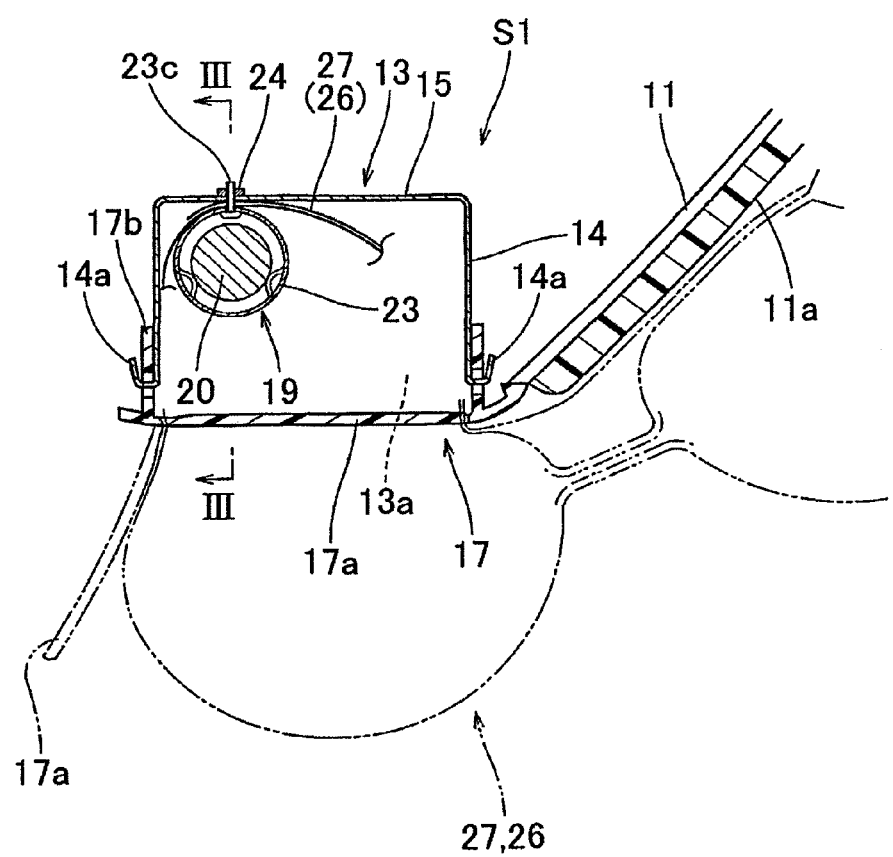
FIG. 2 is a schematic enlarged vertical section of the airbag apparatus of FIG. 1.
Figure 3:
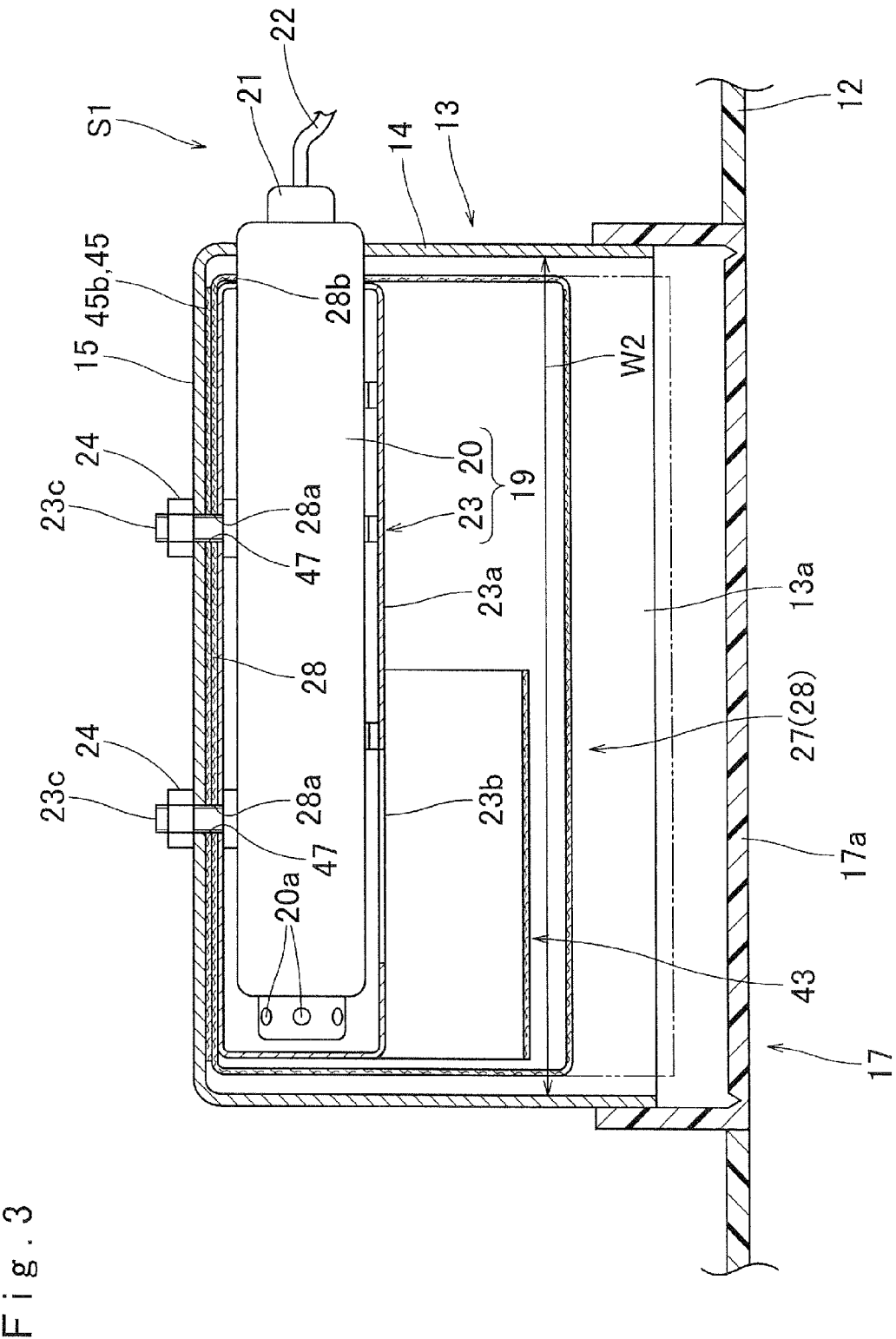
FIG. 3 is a schematic enlarged cross section of the airbag apparatus of FIG. 1 taken along line of FIG. 2.

As shown in FIG. 1 to FIG. 3, the airbag apparatus S1 includes an airbag 26, an inflator 19 for supplying the airbag 26 with inflation gas, a case or housing 13 that houses the inflator 19 and airbag 26 in a folded state, and an airbag cover 17 covering an opening 13b of the case 13.

Referring to FIGS. 1 and 2, the case 13 is made of sheet metal and is to be located at a low site in front of knees K of a driver MD and proximate the front bottom of the instrument panel 11 acting as part of the vehicle body structure. The case 13 is generally formed into a box open at the bottom. Specifically, the case 13 is comprised of a generally square tubular circumferential wall 14, a ceiling wall 15 that closes off the top of the circumferential wall 14 and a generally rectangular opening 13a located at the bottom of the circumferential wall 14. The circumferential wall 14 is so designed that its length direction extends generally in a left and right direction and its axial direction extends generally along a vertical direction. The circumferential wall 14 is provided on its sections opposing in a front and rear direction with a plurality of hooks 14a engageable with later-described mounting tongues 17b of the airbag cover 17. The hooks 14a are arranged along a left and right direction. On the right section of the circumferential wall 14 is a through hole (reference numeral omitted) for receiving the right end (i.e., an end having a connector 21) of a later-described body 20 of the inflator 19. Further, the ceiling wall 15 of the case 13 includes two mounting holes (reference numeral omitted) for receiving later-described bolts 23c of the inflator 19. As shown in FIG. 4, the case 13 is secured to the vehicle body structure 1 by brackets 4 extending from the instrument panel reinforcement 2 (vehicle body structure 1) and connected to left and right end regions of the case 13.

Figure 14:
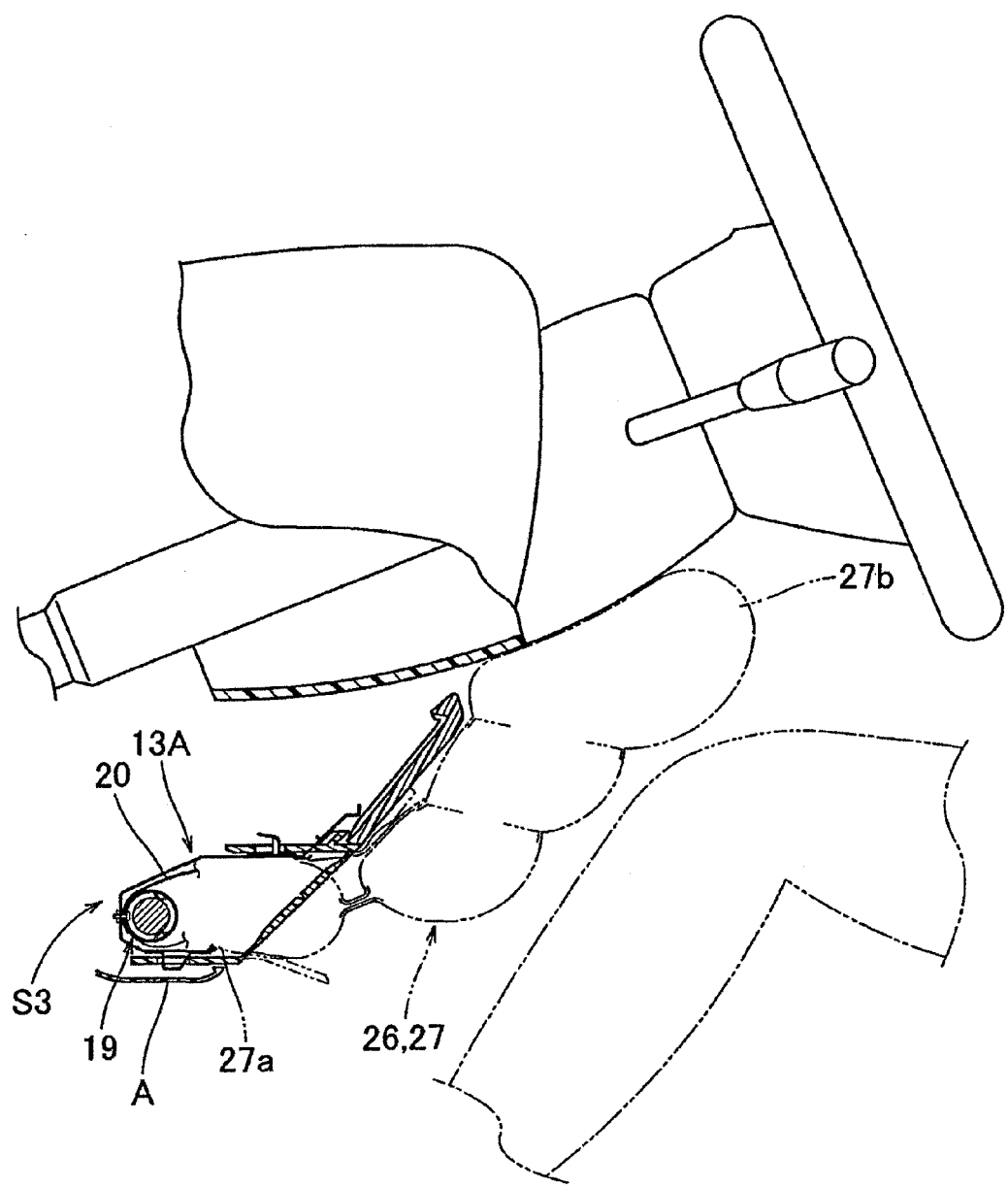
FIG. 14 is a schematic vertical section of an airbag apparatus according to another modification of the invention.

The airbag cover 17 is fabricated of synthetic resin such as thermoplastic elastomer of olefin and covers the opening 13a of the case 13. More specifically, the airbag cover 17 includes a door 17a openable forward upon deployment of the airbag 26 and mounting tongues 17b extending from the peripheral edge of the door 17a and attached to the circumferential wall 14 of the case 13. As shown in FIGS. 1 and 4, the airbag cover 17 in an on-board state is hard to be seen from an interior of the vehicle (i.e., it is located on a region of a vehicle equipped with a later-described airbag apparatus S3 shown in FIG. 14 where an undercover A is located). In this specific embodiment, an undercover 12 is provided on the left and right sides of the door 17a of the airbag cover 17 as shown in FIG. 3.

Referring to FIGS. 2 and 3, the inflator 19 is columnar in shape and is to be so arranged that its axis extends along a left and right direction of a vehicle. It includes a generally columnar body 20 and a diffuser 23 mounted around the body 20. The body 20 is provided on the first end (or left end, in the illustrated embodiment) with a plurality of gas discharge ports 20a while being provided on the second end (or right end) with a connector 21 connected with a lead wire 22 for feeding an actuating signal. The diffuser 23 includes a holding cylinder 23a which is made of sheet metal and formed generally into a cylinder covering the inflator body 20 and a plurality of (two, in the illustrated embodiment) mounting bolts (mounting members) 23c projecting from the holding cylinder 23c. The holding cylinder 23a includes on a left region of the underside in an on-board state a plurality of gas outlets 23b (FIG. 3) for releasing an inflation gas exited the gas discharge ports 20a of the body 20. In the illustrated embodiment, the inflator 19 is housed inside the airbag 26 or bag body 27 with the bolts 23c protruding from later-described mounting holes 28a and the second end projecting out of an insert hole 28b, respectively of the vehicle body side wall 28 of the airbag 26 (bag body 27). The inflator 19 thus housed in the airbag 26 is secured to the ceiling wall 15 of the case 13 together with the airbag 26 by nuts 24 that fasten the bolts 23c.

The airbag 26 is formed of flexible fabric woven of polyester, polyamide yarns or the like. The airbag 26 includes a bag body 27 inflatable with an inflation gas and an outer connecting element 45 located on the outer surface of the bag body 27. The airbag 26 is designed to emerge from the case 13 and deploy upward between knees K (KL and KR) of a driver MD and the instrument panel 11. Specifically, as shown in FIG. 1 (by double-dashed lines) and in FIG. 12, the airbag 26 is designed to cover an area ranging from a rear face 11a of the instrument panel 11 to the rear face 10a of the region of the column cover 10 protruding from the instrument panel 11, in front of the knees K, at full deployment. As shown in FIG. 1, the instrument panel 11 is inclined downward and forward relative to a front and rear direction and curves in such a manner that the middle region in an up and down direction, which is to be covered by the airbag 26, protrudes downward (rearward).

Figure 5:
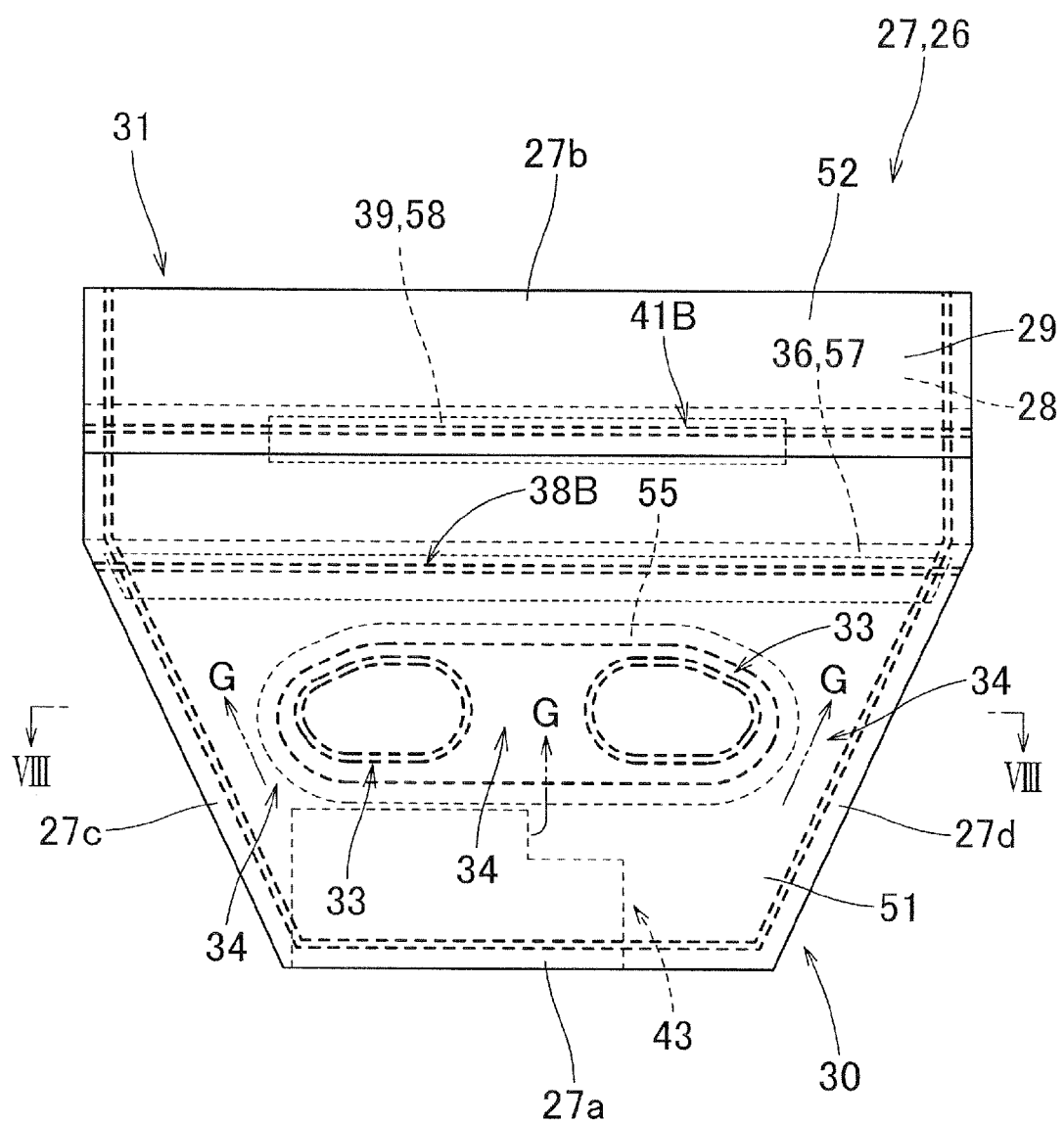
FIG. 5 is a front view of an airbag for use in the airbag apparatus of FIG. 1 in a flattened state.
Figure 6:
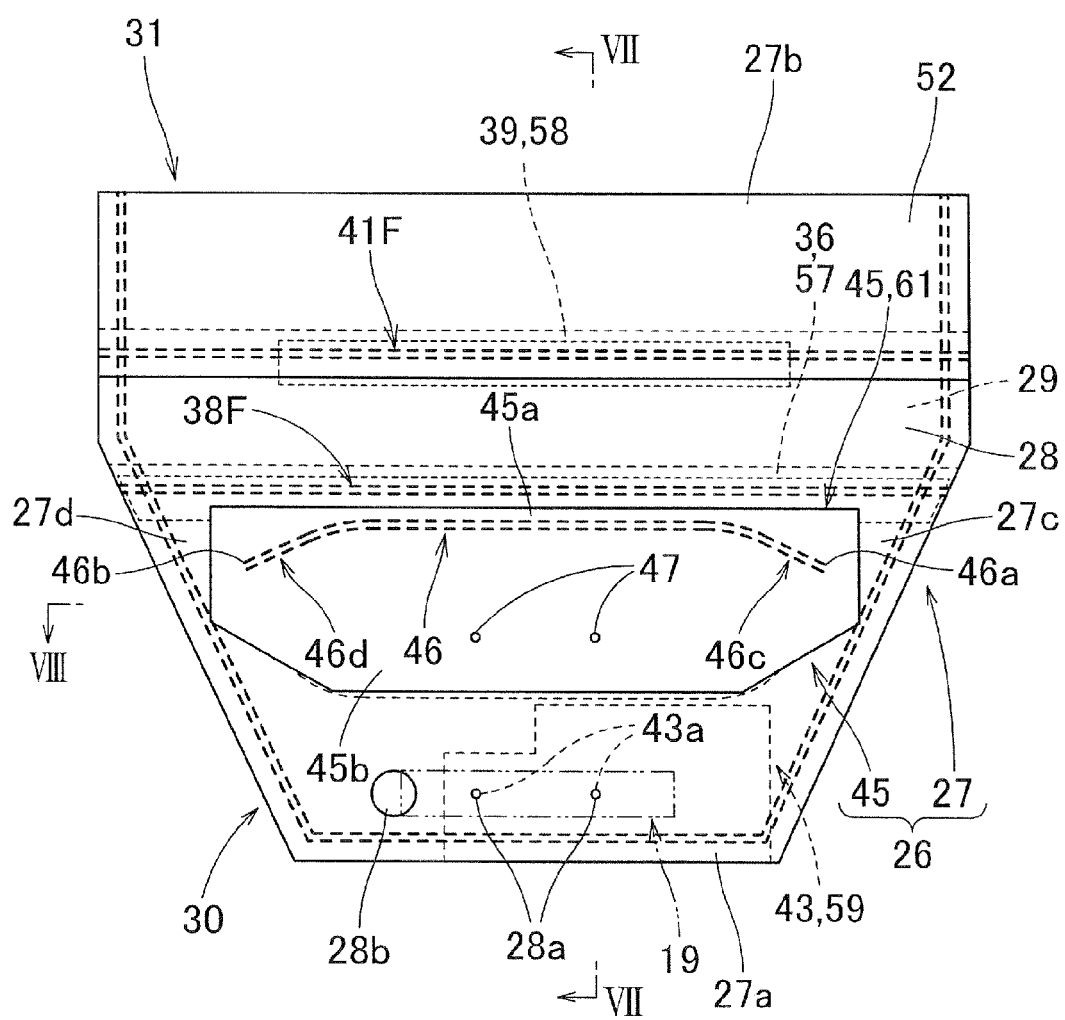
FIG. 6 is a rear view of the airbag of FIG. 5.

Referring to FIGS. 5 and 6, the bag body 27 is designed to be inflatable into such a contour as a home plate including proximate the lower end 27a a mounting region 30 secured to the case 13 and at a region to the upper end 27b a cushioning region 31 for protecting knees K (KL and KR) of a driver MD which is greater in width in a left and right direction than the mounting region 30. More specifically, the bag body 27, in a flattened and noninflated state, has such an outer contour that a rectangle and a trapezoid whose base coincides with the wide side of the rectangle are coupled together. The bag body 27 is made by connecting peripheral edges of a pair of walls having generally identical contours like a home plate; a vehicle body side wall 28 deployable toward the instrument panel (vehicle body structure) 11 and an occupant side wall 29 deployable toward the seat.

As best shown in FIG. 6, on the region of the vehicle body side wall 28 constituting the mounting region 30 are two mounting holes 28a for receiving the bolts 23c of the inflator 19 and an insert hole 28b for receiving the second end, with the connector 21, of the inflator body 20. In the illustrated embodiment, the mounting holes 28a are located on laterally symmetrical locations relative to a line running through the center in a left and right direction of the bag body 27.

Figure 7:
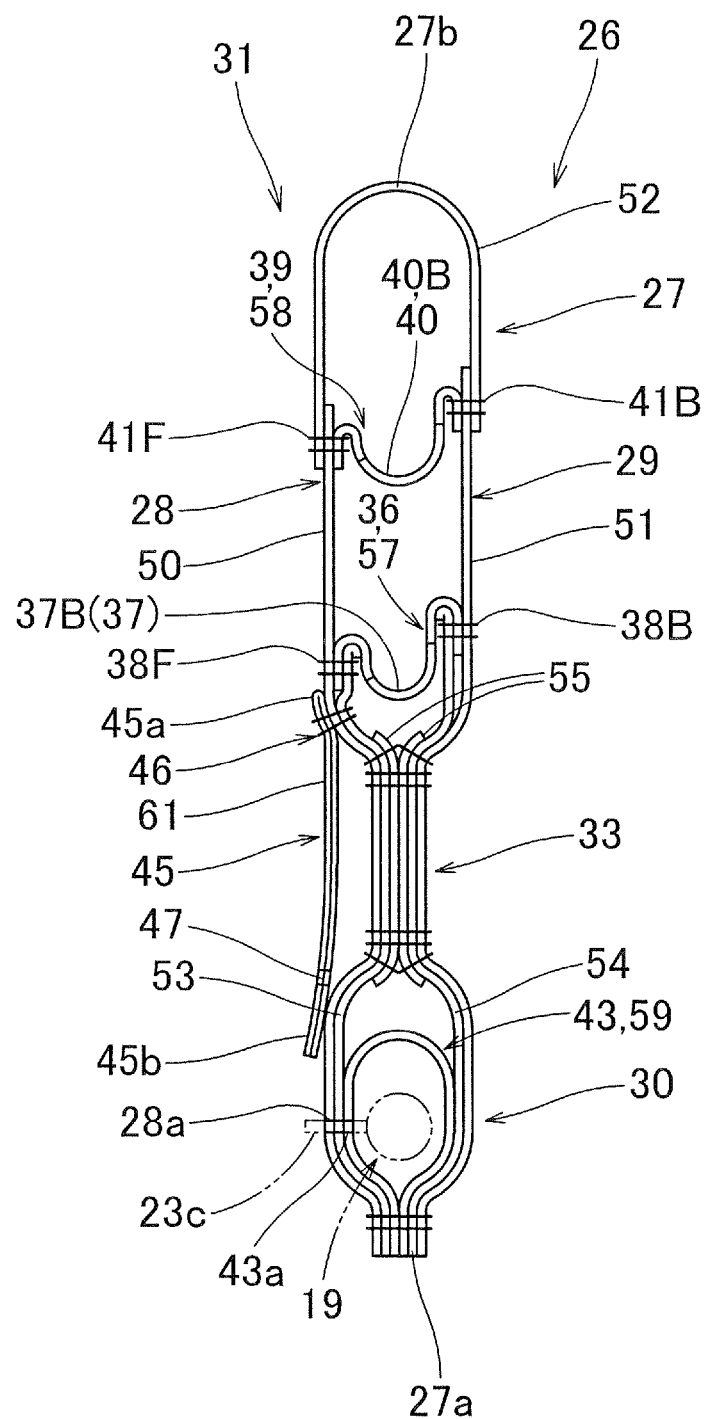
FIG. 7 is a schematic vertical section of the airbag of FIG. 5, taken along line VII-VII of FIG. 6.
Figure 8:
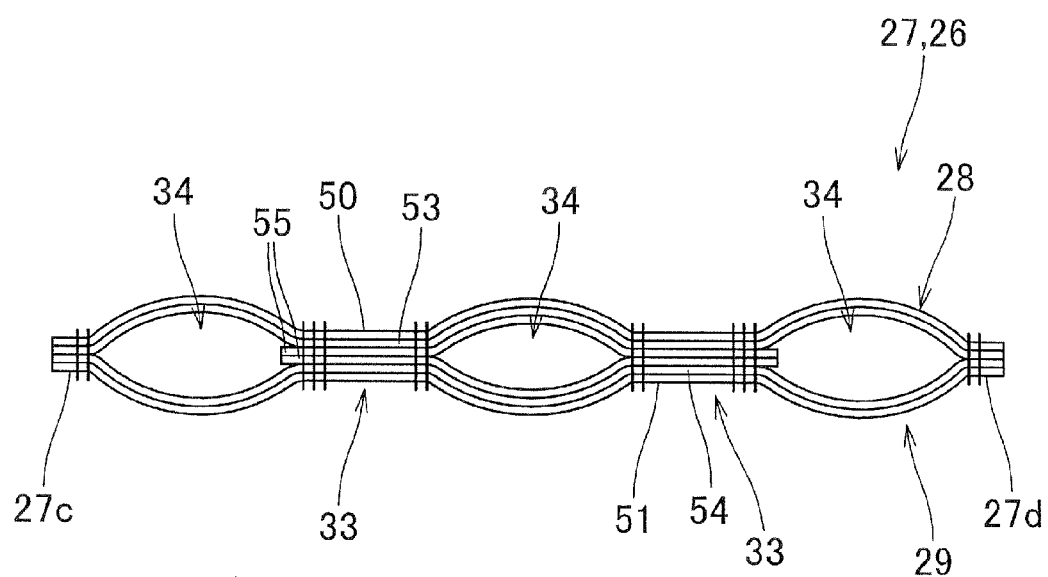
FIG. 8 is a schematic cross section of the airbag of FIG. 5, taken along line VIII-VIII of FIG. 5.
Figure 12:
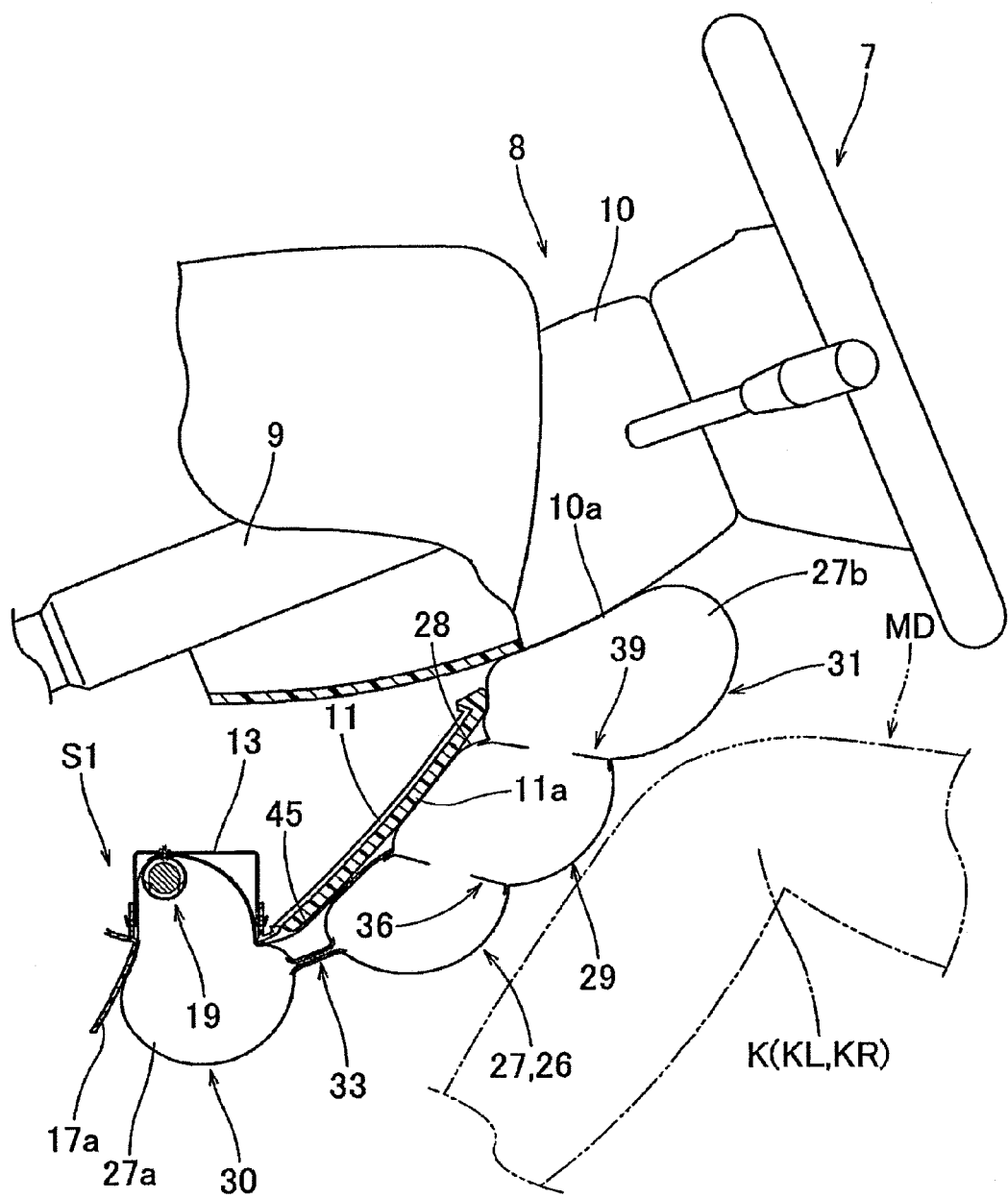
FIG. 12 is a schematic vertical section of the airbag apparatus of FIG. 1 showing the airbag at full deployment.

As shown in FIGS. 5, 7 and 8, the bag body 27 includes on a narrow region proximate the mounting region 30 and below the cushioning region 31 thin regions 33 that are formed by approximating the vehicle body wall 28 and occupant side wall 29 thereby remaining thin upon deployment. The thin regions 33 are arranged along a left and right direction in a mutually separate manner. The bag body 27 of this specific embodiment includes two such thin regions 33 and each of the thin regions 33 is formed by sewing or connecting together the vehicle body side wall 28 and occupant side wall 29 generally in an oval shape so the walls 28 and 29 contact with each other. More specifically, the two thin regions 33 are located on the left and right of the line running through the center in a left and right direction of the bag body 27 in a mutually separate fashion, and are also distant from the left and right edges 27c and 27d of the bag body 27. In this embodiment, the vehicle body side wall 28 and occupant side wall 29 are brought into contact with each other in the areas of the thin regions 33 with reinforcing cloths 55 interposed in between. As shown in FIG. 8, moreover, the thin regions 33 of this specific embodiment are at laterally symmetrical locations and are formed into symmetrical contours relative to the line running through the center in a left and right direction of the bag body 27. As shown in FIG. 12, the location of the thin regions 33 is such as to be located outside of the case 13 and proximate the rear end of the opening 13a of the case 13 at full deployment of the bag body 27. In this embodiment, the region between the thin regions 33 forms one of gas channels 34 of an inflation gas G directed toward the cushioning region 31 located to the top (leading end) 27b of the bag body 27 as shown in FIGS. 5 (by double-dashed lines) and 8. That is, the airbag 26 includes three such gas channels 34; at the sides of left and right edges 27c and 27d of the bag body 27 as well as at the center in a left and right direction.

Referring to FIGS. 5 to 7, the bag body 27 further includes at the region to the upper end (leading end) 27b above the thin regions 33 tethers 36 and 39 that respectively connect the vehicle body side wall 28 and occupant side wall 29 for limiting the thickness of the bag body 27 at full inflation. The two tethers 36 and 39 in this embodiment are arranged along a generally left and right direction and disposed one above the other.

Figure 11:
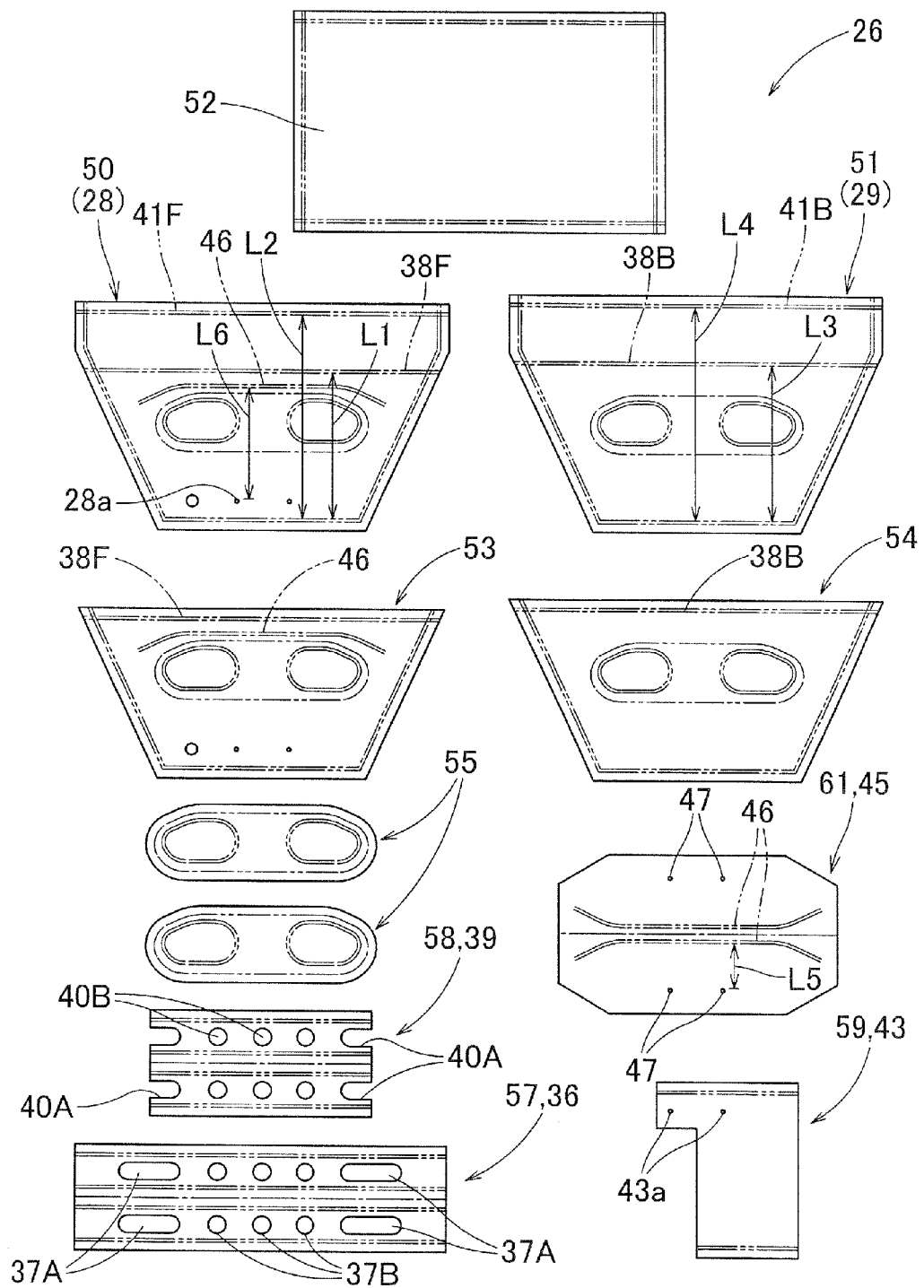
FIG. 11 illustrates base materials of the airbag of FIG. 5 by plan views.

The lower tether 36 is located proximate the bottom of the cushioning region 31 and sewn to an entire inner surface of the bag body 27 in such a manner as to partition the cushioning region 31 and the mounting region 30. Specifically, the tether 36 is formed into a band-like shape whose dimension in a left and right direction is generally the same as that of the location of the tether 36 of the bag body 27. Both edges in a width direction of the tether 36 are respectively sewn to the vehicle body side wall 28 and occupant side wall 29 by stitches 38F and 38B extending along a left and right direction. As shown in FIG. 11, the tether 36 includes a plurality of (five, in this embodiment) gas communication holes 37 arranged along a left and right direction for feeding an inflation gas exited the inflator 19 to the cushioning region 31. More specifically, out of the gas communication holes 37, two holes 37A and 37A at the leftmost and rightmost locations are formed into a generally oblong shape elongate in a left and right direction whereas each of three holes 37B located between the holes 37A and 37A is formed generally into a circle having a smaller opening area than the hole 37A/37A.

The upper tether 39 is located at the center in a left and right direction and slightly below the center in an up and down direction, of the cushioning region 31 inside the area of the cushioning region 31. As shown in FIG. 11, the tether 39 is smaller in dimension in a left and right direction than the tether 36 and the cushioning region 31. In this specific embodiment, the dimension in a left and right direction of the tether 39 is about ½ of that of the cushioning region 31. Both edges in a width direction of the tether 39 are respectively sewn to the vehicle body side wall 28 and occupant side wall 29 by stitches 41F and 41B extending along a left and right direction. The tether 39 includes gas communication holes 40 at locations generally coinciding with the gas communication holes 37A and 37B of the tether 36 in an up and down direction. That is, gas communication holes (recessed regions) 40A formed by cutting out the left and right edges correspond to the gas communication holes 37A whereas three gas communication holes 40B formed generally into a circle between the holes 40A correspond to the gas communication holes 37B.

Further, the dimensions in a width direction of the tethers 36 and 39 are generally identical. In this specific embodiment, each of the tether 36 and 39 is formed by doubling up a later-described base cloth 57/58 at the center in a width direction. As shown in FIG. 7, in a flattened and noninflated state of the bag body 27, the joints to the vehicle body side wall 28 of the tethers 36 and 39 are located slightly below (to the mounting region 30 relative to) the joints to the occupant side wall 29. That is, as shown in FIG. 11, in a flattened state of the vehicle body side wall 28 and occupant side wall 29, the distances L1 and L2 from the bottom of the vehicle body side wall 28 (i.e., from the end of the vehicle body side wall 28 on the side the mounting region 30 is located) to the stitches (joints of the tethers 36 and 39) 38F and 41F are respectively smaller than the distances L3 and L4 from the bottom of the occupant side wall 29 (i.e., from the end of the occupant side wall 29 on the side the mounting region 30 is located) to the stitches (joints of the tethers 36 and 39) 38B and 41B.

As shown in FIGS. 5 to 7, moreover, the mounting region 30 is internally provided with a protection cloth 43 that covers around the gas outlets 23b of the diffuser 23 for protecting the thin regions 33. The protection cloth 43 is provided for preventing an inflation gas exited the gas discharge ports 20a of the inflator 19 from immediately heading toward the thin regions 33. The protection cloth 43 is formed into a generally cylindrical shape that is open at left and right ends and covers the entire circumference of the left side region of the diffuser 23 (where the gas outlets 23b are located) (FIG. 3). The protection cloth 43 redirects an inflation gas exited the gas outlets 23b of the diffuser 23 in left and right directions in the mounting region 30, thereby preventing the gas from directly heading upward, i.e., toward the thin regions 33. The lower end region (where the bolts 23c are located) of the protection cloth 43 is extended toward the right and therefore wide in a left and right direction. Two apertures 43a are provided on this lower end region as shown in FIG. 11 for receiving the bolts 23c. That is, the protection cloth 43 concurrently serves as a reinforcing cloth that reinforces the area around the mounting holes 28a of the bag body 27. As shown in FIG. 7, the protection cloth 43 is formed into a cylinder by doubling up a later-described base cloth 59 so its edges extending along a left and right direction align and sewing these edges together with edges (lower edges) of later-described base cloths 50 and 51 constituting the lower area of the vehicle body side wall 28 and occupant side wall 29.

Figure 9:
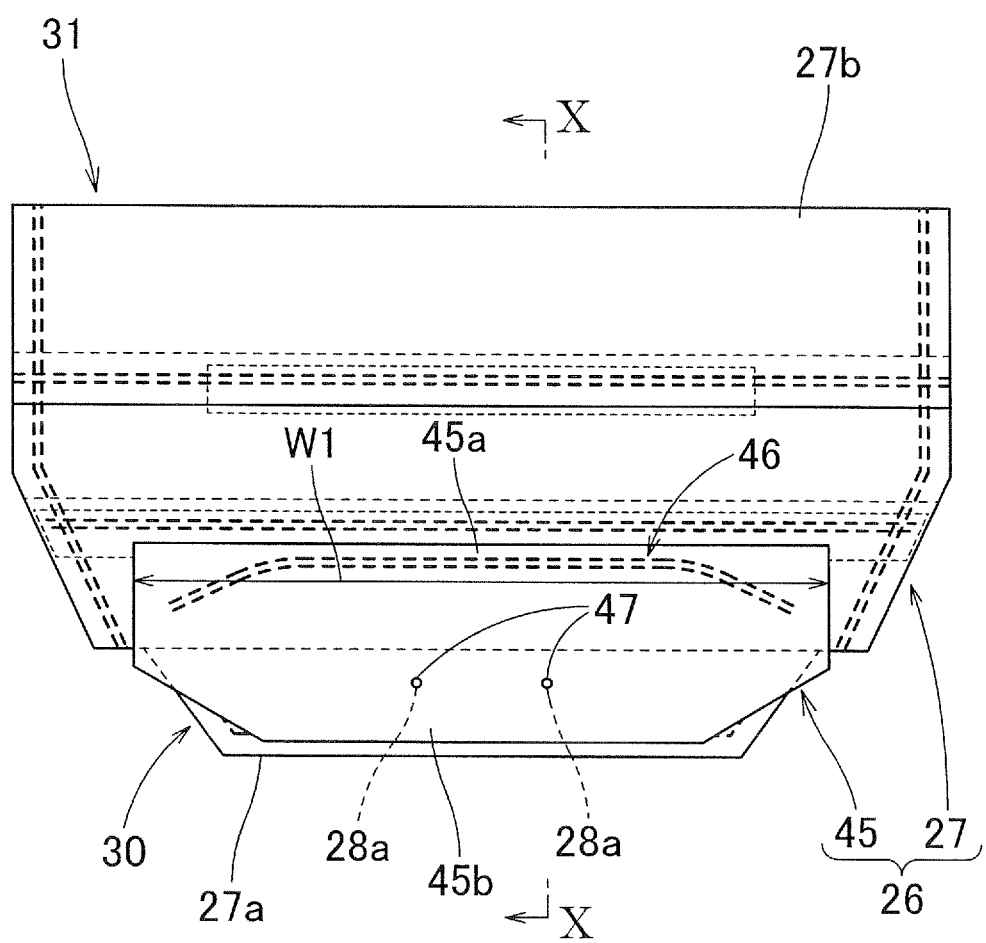
FIG. 9 is a rear view of the airbag of FIG. 5 in which bolts of an inflator protruding from the airbag are put through mounting holes of an outer connecting element.
Figure 10:
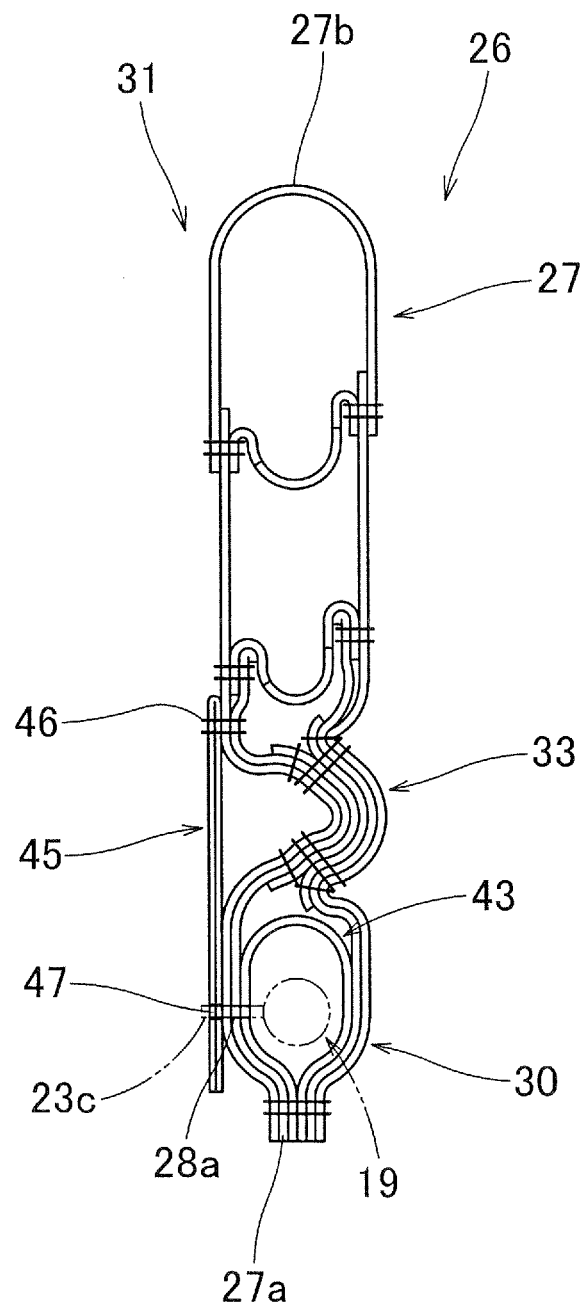
FIG. 10 is a sectional view taken along line X-X of FIG. 9.

Referring to FIG. 6 and FIG. 9, the outer connecting element 45 is formed into such an outer contour as a flat home plate with a wide upper edge 45a and narrow lower edge 45b by a sheet material formed by folding a later-described base cloth 61 (FIG. 11) in half. The outer connecting element 45 is connected to the vehicle body side wall 28 by two joints arranged away from each other in an up and down direction; at the vicinities of the upper edge 45a and lower edge 45b. The width W1 (FIG. 9) in a left and right direction of the upper edge 45a region, which is located down the stream of inflation gas, is greater than the width in a left and right direction of the mounting region 30 or width W2 in a left and right direction of the case 13, as referred to FIG. 3. In this specific embodiment, the upper edge 45a of the outer connecting element 45 is generally wholly sewn or connected to a region between the lower tether 36 and thin regions 33 of the vehicle body side wall 28 by a stitch 46 which is formed into a generally straight and continuous line extending along a left and right direction. That is, the stitch 46 constitutes an upper joint, one of the two joints of the outer connecting element 45. The outer connecting element 45 includes proximate the lower edge 45b two mounting holes 47 for receiving the bolts 23c of the inflator 19. That is, the lower edge 45b of the outer connecting element 45 is attached to the case 13 together with the bag body 27 by the bolts 23c of the inflator 19, thereby connected to the vehicle body side wall 28 in such a manner as to be clamped between the case 13 and inflator 19 as shown in FIG. 3, and forming a lower joint, the other joint of the outer connecting element 45. As shown in FIG. 10, the thin regions 33 of the bag body 27 are located between the two, upper and lower joints of the outer connecting element 45 to the vehicle body side wall 28, i.e., between the stitch 46 and mounting holes 47.

The outer connecting element 45 is provided for reducing a substantial length of the vehicle body side wall 28 in an up and down direction upon deployment compared to that in a flattened and noninflated state, as referred to FIGS. 9 and 10. To this end, as shown in FIG. 11, the distance L5 in an up and down direction between the stitch 46 and mounting holes 47 of the outer connecting element 45 is smaller than the distance L6 in an up and down direction between the stitch 46 and mounting holes 28a of the vehicle body side wall 28 in a flattened state. The ratio of dimensions of the distances L5 and L6 is variable, subject to the inclination angle of the instrument panel 11 to be covered by the bag body 27. In the airbag 26 of this embodiment, the ratio of dimensions of the distances L5 and L6 is about 2:5.

In this specific embodiment, the stitch 46 that connects the generally entire area of the upper edge 45a of the outer connecting element 45 in a left and right direction to the vehicle body side wall 28 is so formed as to extend outwardly in a left and right direction beyond the mounting holes 47 and 28a (i.e., the bolts 23c of the inflator 19), as shown in FIGS. 6 and 9. Opposite end portions 46c and 46d of the stitch 46 are so curved that their terminals 46a and 46b located outside of the mounting holes 47 in a left and right direction are headed downward (i.e., toward the mounting region 30 or up the stream of inflation gas). In this specific embodiment, the curves of the end portions 46c and 46d of the stitch 46 are formed along the outer contours of the thin regions 33 each having a generally oval shape. Further, the outer connecting element 45 of the embodiment, including the stitch 46 and mounting holes 47, is laterally symmetrical relative to the line running through the center in a left and right direction of the bag body 27.

The airbag 26 is formed by sewing together base cloths comprised of a woven fabric of polyamide, polyester or the like and cut in predetermined shapes, using sewing threads. As shown in FIG. 11, the airbag 26 is comprised of three main base cloths 50, 51, 52 for forming the bag body 27, four reinforcing cloths 53, 54, 55, two base cloths 57 and 58 for forming the tethers 36 and 39, a base cloth 59 for forming the protection cloth 43 and a base cloth 61 for forming the outer connecting element 45.

The main base cloths 50 and 51 are to constitute areas of the vehicle body side wall 28 and occupant side wall 29 ranging from the mounting region 30 to the location of the upper tether 39 in the cushioning region 31, i.e., areas below the tether 39. The base cloths 50 and 51 are generally identical in outer contour, generally like a home plate. Since the locations of the joints of the tether 39 (i.e., the locations of the stitches 41F and 41B) slightly differ in an up and down direction between the vehicle body side wall 28 and the occupant side wall 29, as described above, the base cloth 51 forming the occupant side wall 29 is slightly greater in a vertical dimension than the base cloth 50 forming the vehicle body side wall 28, as shown in FIG. 11. The main base cloth 52 is to constitute areas of the vehicle body side wall 28 and occupant side wall 29 above the upper tether 39 and is generally rectangular in outer shape. The reinforcing cloths 53 and 54 are provided for reinforcing areas of the vehicle body side wall 28 and occupant side wall 29 below the lower tether 36, and are respectively formed into a generally trapezoidal shape. Since the locations of the joints of the lower tether 36 (i.e., the locations of the stitches 38F and 39B) also slightly differ in an up and down direction between the vehicle body side wall 28 and the occupant side wall 29, the reinforcing cloth 54 applied to the occupant side wall 29 is slightly greater in a vertical dimension than the reinforcing cloth 53 applied to the vehicle body side wall 28, as shown in FIG. 11. The reinforcing cloths 55 are to reinforce the area where the thin regions 33 are located. In this embodiment, two reinforcing cloths 55 are used for this purpose. The base cloths 57 and 58 are to form the tethers 36 and 39, respectively, in a half-folded state, and are respectively provided with openings to form the gas communication holes 37A and 37B/40A and 40B. The base cloth 61 is to form the outer connecting element 45 in a half-folded state, as described above, and is provided with apertures to form the mounting holes 47.

Manufacturing of the airbag 26 is now described. The base cloths 57 and 58 for the tethers 36 and 39 are folded in half in advance. Firstly, ends of the main base cloth 52 in a width direction are sewn together with the upper edges of the main base cloths 50 and 51 with sewing threads. At the same time, the base cloth 58 for the upper tether 39 in a half-folded state is allocated on inner sides of the base cloths 50 and 51 and sewn to the upper edges of the base cloths 50 and 51 by the edges in a width direction, thereby connecting the tether 39 to the vehicle body side wall 28 and occupant side wall 29 by the stitches 41F and 41B. Then the reinforcing cloths 53 and 54, and then a pair of the reinforcing cloths 55 are laid on the base cloths 50 and 51 in this order and sewn to the main base cloths 50 and 51, respectively, at peripheral edges of the reinforcing cloths 55. Subsequently, first and second edges in a width direction of the base cloth 57 for the lower tether 36 are placed between the main base cloth 50 and base cloth 53, and between the main base cloth 51 and base cloth 54, respectively. Then the upper edge of the reinforcing cloth 53 and the first edge of the base cloth 57 are sewn to the main base cloth 50 whereas the upper edge of the reinforcing cloth 54 and the second edge of the base cloth 57 are sewn to the main base cloth 51, by sewing threads, respectively, thereby connecting the lower tether 36 to the vehicle body side wall 28 and occupant side wall 29 by the stitches 38F and 38B. Thereafter, the base cloth 61 for forming the outer connecting element 45, which is folded in two, is sewn to the main base cloth 50 and reinforcing cloth 53 by the stitch 46, beneath the stitch 38F. Then the main base cloths 50 and 51 are flattened in such a manner as to align their peripheral edges, and the thin regions 33 are formed by sewing the main base cloths 50, 51 and the reinforcing cloths 53, 54 and 55 together by sewing threads. Thereafter, the base cloth 59 for the protection cloth 43, which is folded in half, is placed between the reinforcing cloths 53 and 54, and then left, right and lower edges of the main base cloths 50 and 51, and left and right edges (i.e., edges in the length direction) of the main base cloth 52, folded in half in an up and down direction, are sewn together. The airbag 26 is thus formed, with the upper edge 45a of the outer connecting element 45 connected to the vehicle body side wall 28.

Described now is how to mount the airbag apparatus S1 according to the first embodiment of the invention on a vehicle. Firstly, the inflator 19 is housed inside the bag body 27 so the second end of the inflator body 20, which is to be connected with the connector 21, protrudes from the insert hole 28b whereas the bolts 23c project out of the mounting holes 28a. The bolts 23c are put through the mounting holes 47 of the outer connecting element 45 to connect the lower edge 45b of the outer connecting element 45 temporarily to the vehicle body side wall 28. Then the airbag 26 is folded up to fit in the case 13, and is wrapped by a tearable wrapping member (unillustrated) for keeping the folded-up configuration. At this time, the bolts 23c of the inflator 19 and the second end of the inflator body 20 are taken out of the wrapping member.

Subsequently, the airbag 26 folded up and housing the inflator 19 is set in the case 13 from the opening 13a so the bolts 23c of the inflator 19 and the second end of the inflator body 20 project out of corresponding apertures (unillustrated) of the case 13. Then the bolts 23c projecting from the ceiling wall 15 are fastened with the nuts 24, such that the inflator 19 and airbag 26 are secured to the case 13 and the lower edge 45b of the outer connecting element 45 is connected to the vehicle body side wall 28 in such a manner as to be clamped between the case 13 and inflator 19. Thereafter, the airbag cover 17 is assembled with the case 13 by the hooks 14a of the case 13, and then the case 13 is secured to the vehicle body structure 1 by the brackets 4 extending from the instrument panel reinforcement 2. At the same time, the connector 21 provided with a lead wire 22 is connected with the second end of the inflator body 20. If then the instrument panel 11 and under cover 12 are mounted, the airbag apparatus S1 is mounted on the vehicle.

After the airbag apparatus S1 is mounted on the vehicle, if an actuating signal is fed to the inflator body 20 via the lead wire 22, an inflation gas is discharged from the gas discharge ports 20a of the inflator 19 and flows into the bag body 27 via the gas outlets 23b of the diffuser 23. Then the bag body 27 inflates and breaks the wrapping member, and pushes and opens the door 17a of the airbag cover 17, so that the bag body 27 emerges from the opening 13a of the case 13 and deploys to cover the rear faces 11a and 10a of the instrument panel 11 and column cover 10 while unfolding upward as shown in FIGS. 1 (by double-dashed lines) and 12.

In the airbag apparatus S1 according to the first embodiment of the invention, the bag body 27 includes the thin regions 33 that remain thin by keeping the vehicle body wall 28 and occupant side wall 29 approximated upon deployment. The thin regions 33 will help bend the bag body 27 upon deployment at the location of the thin regions 33. Further, the airbag 26 includes the outer connecting element 45 that is located on the outer face of the vehicle body side wall 28 and connected to the vehicle body side wall 28 by the two joints arranged away from each other in an up and down direction at deployment so as to reduce the length in an up and down direction of the vehicle body side wall 28 at deployment, and the thin regions 33 are located between the two joints of the outer connecting element 45 to the vehicle body side wall 28. Upon deployment, the outer connecting element 45 will pull the upper end or leading end 27b of the bag body 27 toward the case 13 to which the opposite end of the bag body 27, i.e., the mounting region 30, is secured, such that the bag body 27 will deploy in a bowing fashion with the upper end 27b oriented toward the instrument panel 11 as part of the vehicle body structure. Moreover, the thin regions 33 are arranged generally along a left and right direction of the bag body 27 in a mutually separate manner. This configuration will help bend the bag body 27 at the location of the thin regions 33 in a steady fashion in a wide range in a left and right direction. Additionally, the separate arrangement of the thin regions 33 will allow an inflation gas flown into the mounting region 30 to pass through the gas channel 34 formed between the thin regions 33 and flow into the cushioning region 31, i.e., the area of the bag body 27 ranging from the thin regions 33 to the upper end (leading end) 27b, thereby helping inflate the whole bag body 27 quickly. As a result, the airbag apparatus S1 of the first embodiment is capable of so deploying the airbag 26 as to cover the rear face 11a of the instrument panel 11 and the rear face 10a of the column cover 10 smoothly and quickly even if the instrument panel 11 has such a curved shape that the middle region in an up and down direction protrudes rearward.

Therefore, the airbag apparatus S1 of the first embodiment is capable of deploying the airbag 26 along the curved rear face 11a of the instrument panel 11 smoothly for steady protection of knees K of a driver MD as an occupant.

In the airbag apparatus S1, the cushioning region 31 located on the side of the upper end 27b of the bag body 27 is greater in width in a left and right direction than the mounting region 30 located on the side of the lower end 27a, such that the bag body 27 in a flattened and noninflated state has a shape like a home plate. Further, the thin regions 33 are located in the area with the narrow width below the cushioning region 31. In other words, the thin regions 33 are located out of the cushioning region 31 for protecting knees K (KL and KR) of a driver MD. This configuration will not hinder the inflation of the cushioning region 31, and the cushioning region 31 will be capable of inflating in a thick and wide fashion and cushioning the knees K softly. If such an advantageous effect does not have to be considered, the configuration of the later-described fourth embodiment of the invention may also be adopted.

Moreover, since each of the thin regions 33 of the airbag apparatus S1 is made by connecting the vehicle body side wall 28 and occupant side wall 29 in such a manner as to bring the walls 28 and 29 into contact with each other, the thin regions 33 remain very thin upon airbag deployment, so that the bag body 27 can bend in a large degree at the location of the thin regions 33. Especially, each of the thin regions 33 is formed by stitching (connecting) the vehicle body side wall 28 and occupant side wall 29 together into a generally oval shape in such a manner as to bring the walls 28 and 29 into contact with each other, thereby forming the thin regions 33 wide in a front and rear direction as well as in a left and right direction. This configuration will help prevent stress concentration from occurring at the locations of the thin regions 33 upon inflation of the bag body 27. If such an advantageous effect does not has be considered, the thin regions may be formed by connecting the vehicle body side wall and occupant side wall with a clearance in between by a tethering element or the like.

Further, in the first embodiment, more than one thin regions 33 are formed at such locations that are laterally symmetrical relative to the center in a left and right direction of the bag body 27 and are distant from the left and right edges 27c and 27d of the bag body 27. That is, more than one gas channels 34 that feed an inflation gas to the area to the leading end (upper end) 27b of the bag body 27 (i.e., to the cushioning region 31) are formed between the thin regions 33, on laterally symmetrical locations including the sides of the left and right edges 27c and 27d. This configuration will help inflate the bag body 27 quickly, in a balanced manner in a left and right direction. In the first embodiment, especially, the two thin regions 33 are formed at laterally symmetrical locations relative to the center in a left and right direction of the bag body 27 in a mutually separate fashion. As shown in FIGS. 5 and 8, this configuration forms three gas channels 34 at the sides of the left and right edges 27c and 27d and generally at the center in a left and right direction of the bag body 27, thereby quickly inflating a central area in a left and right direction of the bag body 27 as well, and inflating the bag body 27 generally over an entire area in a left and right direction quickly. Accordingly, the bag body 27 of the first embodiment is capable of unfolding widely in a left and right direction while securing a certain degree of thickness at the center in a left and right direction.

If the advantageous effect as described above does not have to be considered, the outer contour, location, and number of the thin region should not be limited to those described in the foregoing embodiments.

In the first embodiment, the outer connecting element 45 is secured to the vehicle body side wall 28 by the area proximate the lower edge 45b when the bolts 23c of the inflator 19 housed in the mounting region 30 attach the lower edge 45b area to the case 13 together with the bag body 27. With this configuration, the upper edge 45a of the outer connecting element 45 has only to be connected (sewn) to the vehicle body side wall 28 of the bag body 27 when manufacturing the airbag 26. This will facilitate the manufacturing of the airbag compared to an instance where both of the upper edge and lower edge of the outer connecting element are connected (sewn) to the vehicle body side wall with sewing threads or the like. Specifically, since only the upper edge 45a of the outer connecting element 45 is sewn to the vehicle body side wall 28, the whole airbag 26 can be manufactured by planar sewing work. However, if both of the upper edge 45a and lower edge 45b of the outer connecting element 45 are sewn to the vehicle body side wall 28 by a sewing thread so as to shorten the vehicle body side wall 28 in an up and down direction, a three-dimensional sewing work will be required in sewing peripheral edges of the occupant side wall 29 and shortened vehicle body side wall 28, which will complicate the manufacturing of the airbag.

Furthermore, the outer connecting element 45 of the airbag apparatus S1 of the first embodiment is comprised of a single sheet material that is greater in width in a left and right direction than that of the case 13 at its area proximate the upper edge 45a located down the stream of the inflation gas. The joint that connects the area proximate the upper edge 45a to the vehicle body side wall 28 is comprised of the stitch 46 that is formed into a generally straight and continuous line extending generally along a left and right direction and extending outwardly in a left and right direction beyond the bolts 23c of the inflator 19 for mounting the bag body 27 to the case 13. That is, the stitch 46 is greater in a width in a left and right direction than that of the joint on the side of the lower edge 45b located up the stream inflation gas (i.e., than a distance between the bolts 23c of the inflator 19, or between the mounting holes 47). However, the left and right end portions 46c and 46d of the stitch 46 are so curved that their terminals 46a and 46b are headed up the stream of the inflation gas, i.e., toward the mounting region 30. This configuration will shorten the distance between the terminals 46a and 46b of the stitch 46 and the bolts 23c and enable the outer connecting element 45 to pull the vehicle body side wall 28 generally uniformly toward the case 13 by the generally entire area in a left to right direction at an initial stage of inflation of the bag body 27. Therefore, the bag body 27 will be capable of deploying along the rear faces 11a and 10a of the instrument panel 11 and column cover 10 quickly and steadily by its generally entire area in a left and right direction. If such an advantageous effect does not have to be considered, the end portions of the stitch that connects the upper edge (downstream side region) of the outer connecting element to the vehicle body side wall do not have to be formed in a curved manner. Further, the outer connecting element may be comprised of more than one split parts instead of a single sheet material.

The airbag apparatus S1 according to the first embodiment further includes on an area to the upper end 27b of the bag body 27 relative to the thin regions 33 the tethers 36 and 39 that respectively connect the vehicle body side wall 28 and occupant side wall 29 for limiting the thickness of the bag body 27 at full inflation. Each of the tethers 36 and 39 is arranged generally along a left and right direction. With respect to the lower tether 36, in a flattened and noninflated state of the vehicle body side wall 28 and occupant side wall 29, the distance L1 on the vehicle body side wall 28 between the end proximate the mounting region 30 and the joint 38F with the lower tether 36 is smaller than the distance L3 on the occupant side wall 29 between the end proximate the mounting region 30 and the joint 38B with the tether 36. That is, the distance L3 (i.e., the length in an up and down direction) on the occupant side wall 29, which is deployable away from the instrument panel 11, between the lower end and the tether 36 is greater relative to that of the vehicle body side wall 28, thereby helping bend the bag body 27 even more easily at the location of the thin regions 33. Furthermore, the above configuration is conducive to lengthen the substantial length of an area of the occupant side wall 29 from the end proximate the mounting region 30 to the tether 36 that can inflate freely in an arcuate fashion compared to an instance where the distance L3 on the occupant side wall 29 is identical to the distance L1 on the vehicle body side wall 28, thereby rendering the bag body 27 even more pliable though the bag body 27 is internally provided with the tethers 36 and 39. Without considering such an advantageous effect, the lower tether may be connected to the vehicle body side wall and occupant side wall at the same positions in an up and down direction. Further, the number of the tethers located inside the bag body is not limited to that disclosed in the foregoing embodiment, but may also be only one, or more than two.

Figure 13:
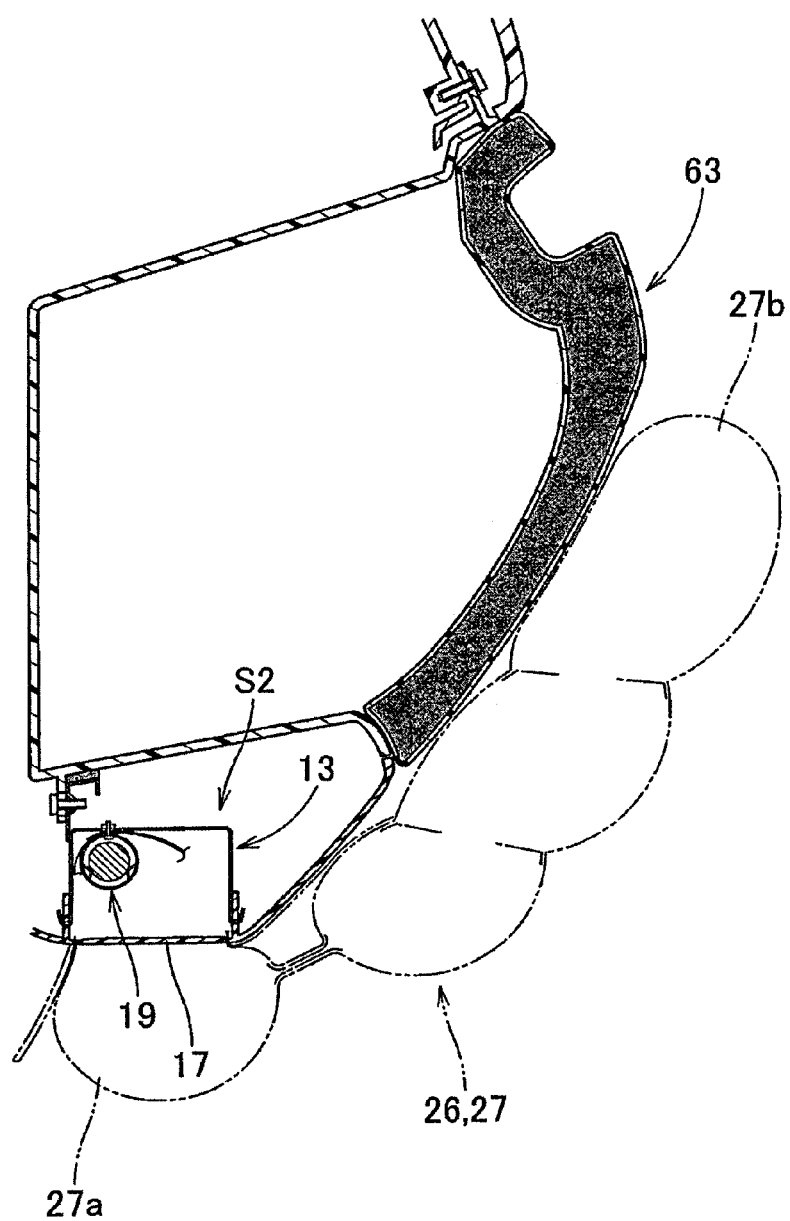
FIG. 13 is a schematic vertical section of an airbag apparatus according to a modification of the invention.

The first embodiment has been described as the case 13 of the airbag apparatus S1 is mounted proximate the front lower end of the instrument panel 11 such that the opening 13a for allowing the emergence of the airbag 26 is directed downward. With this configuration, the bag body 27 is once launched downward from the opening 13a of the case 13. However, since the bag body 27 can bend properly at the location of the thin regions 33, the bag body 27 is capable of deploying along the rear face 11a of the instrument panel 11 smoothly with the leading end (upper end 27b) of the bag body 27 headed upward. Although the first embodiment has been described as the airbag apparatus S1 is mounted in front of a driver's seat and under the column cover 10 mounted around the steering column 8, the invention may also be applied to an airbag apparatus S2 shown in FIG. 13, which is to be mounted beneath a glove box 63 for protecting knees of an occupant seated in a front passenger's seat such that a case 13 which houses an airbag 26 and an inflator 19 is openable downward upon actuation alike the airbag apparatus S1. The airbag apparatus S2 is mounted on a vehicle body structure by the case 13 secured to the glove box 63. Moreover, the application of the invention may also be like an airbag apparatus S3 shown in FIG. 14, which is mounted on a vehicle such that an opening for emergence of the airbag 26 of its case 13A is located at the rear.

Figure 15:
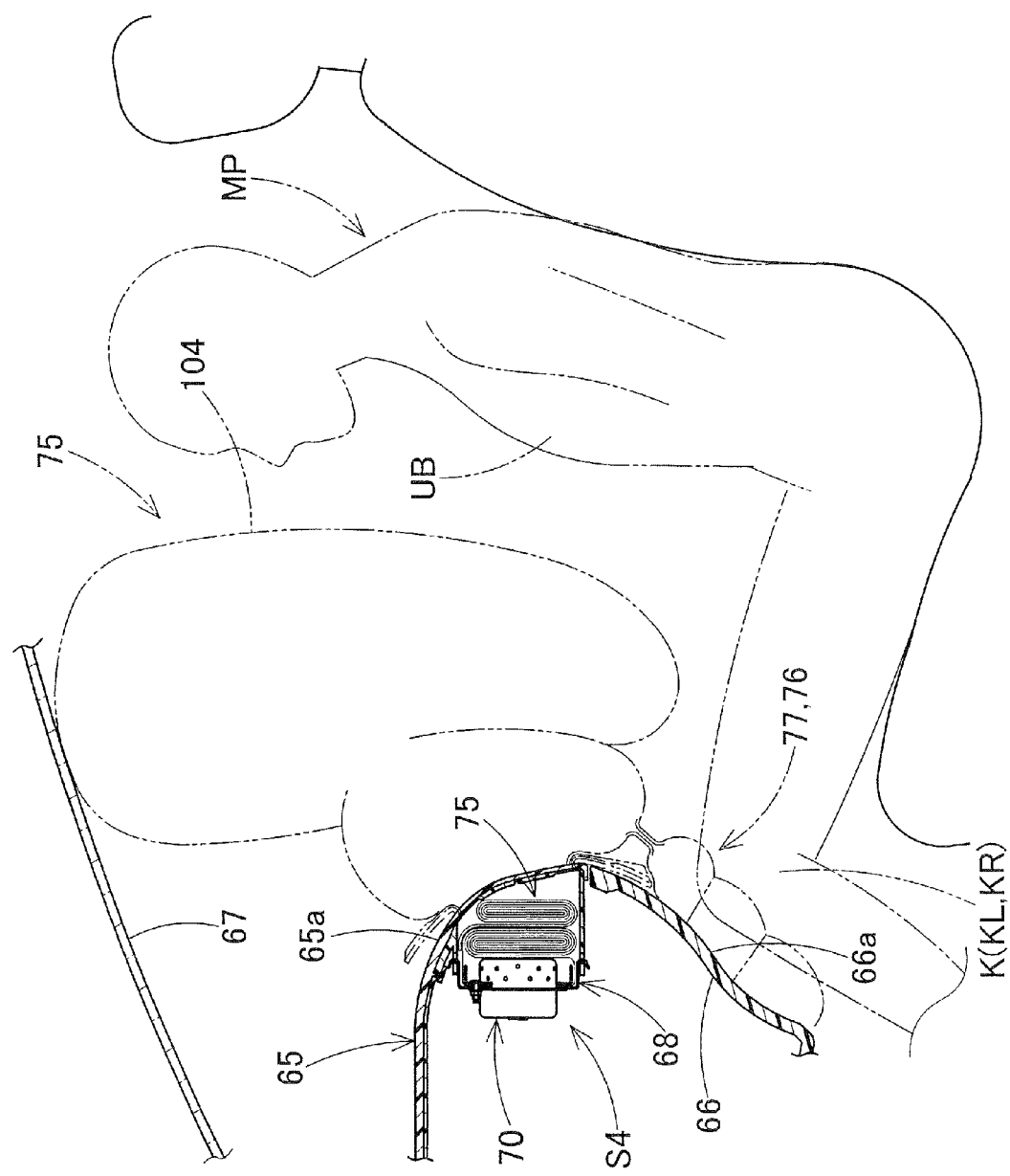
FIG. 15 is a schematic vertical section of an airbag apparatus according to the second embodiment of the invention in a on-board state.

The second embodiment of the invention is now described. As shown in FIG. 15, an airbag apparatus S4 according to the second embodiment of the invention is located in front of an occupant MP seated in a front passenger's seat, especially in front of and above knees K (above kneepans). The airbag apparatus S4 of this specific embodiment is so called "midmount" airbag apparatus which is mounted proximate a portion of an instrument panel 65 most protruding rearward.

Figure 16:
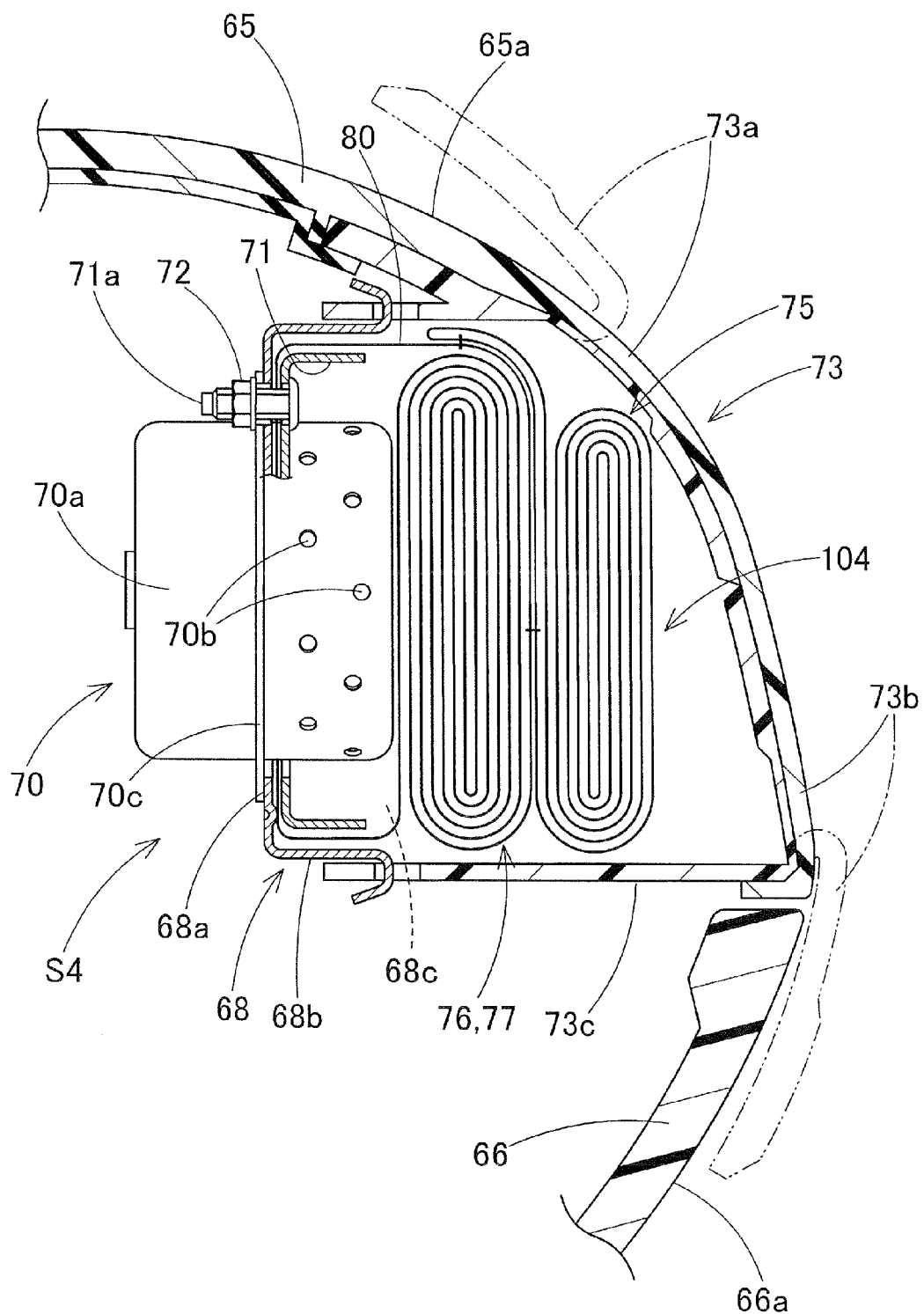
FIG. 16 is a schematic enlarged vertical section of the airbag apparatus of FIG. 15.

Referring to FIGS. 15 and 16, the airbag apparatus S4 includes an airbag 75, an inflator 70 for supplying the airbag 75 with inflation gas, a case or housing 68 that houses the inflator 70 and airbag 75 in a folded state, a retainer 71 for attaching the airbag 75 to the case 68 and an airbag cover 73 covering the rear side of the airbag 75.

The airbag cover 73 of this embodiment is integral with the instrument panel 65 fabricated of synthetic resin, and includes two doors 73a and 73b openable upward and downward, respectively, when pushed by the airbag 75 upon deployment. Around the doors 73a and 73b is a joint wall 73c that extends forward for attachment to the case 68.

As best shown in FIG. 16, the inflator 70 is so located that its axial direction extends generally along a front and rear direction, and includes a generally columnar body 70a which is provided with a plurality of gas discharge ports 70b and a flange 70c used to attach the inflator 70 to the case 68.

The case 68 is made of sheet metal into a generally rectangular parallelepiped contour provided with a rectangular opening 68c at the rear. The case 68 includes a bottom wall 68a having a generally rectangular plate shape, to which the inflator 70 is attached, and a circumferential wall 68b extending rearward from the outer circumference of the bottom wall 68a for engagement with the joint wall 73c of the airbag cover 73. Although not shown, the case 68 is provided on the bottom wall 68a with brackets used for mounting on a vehicle body structure.

The retainer 71 is generally annular in shape and provided with a plurality of bolts 71a. The retainer 71 is housed inside the airbag 75 such that the bolts 71a are put through later-described mounting holes 78b arranged around an inlet opening 78a of the airbag 75, and then through mounting holes 92 of an outer connecting element 89, the bottom wall 68a of the case 68 and then the flange 70c of the inflator 70. The bolts 71a are then fastened with nuts 72, such that the airbag 75 and inflator 70 are secured to the case 68.

Figure 17:
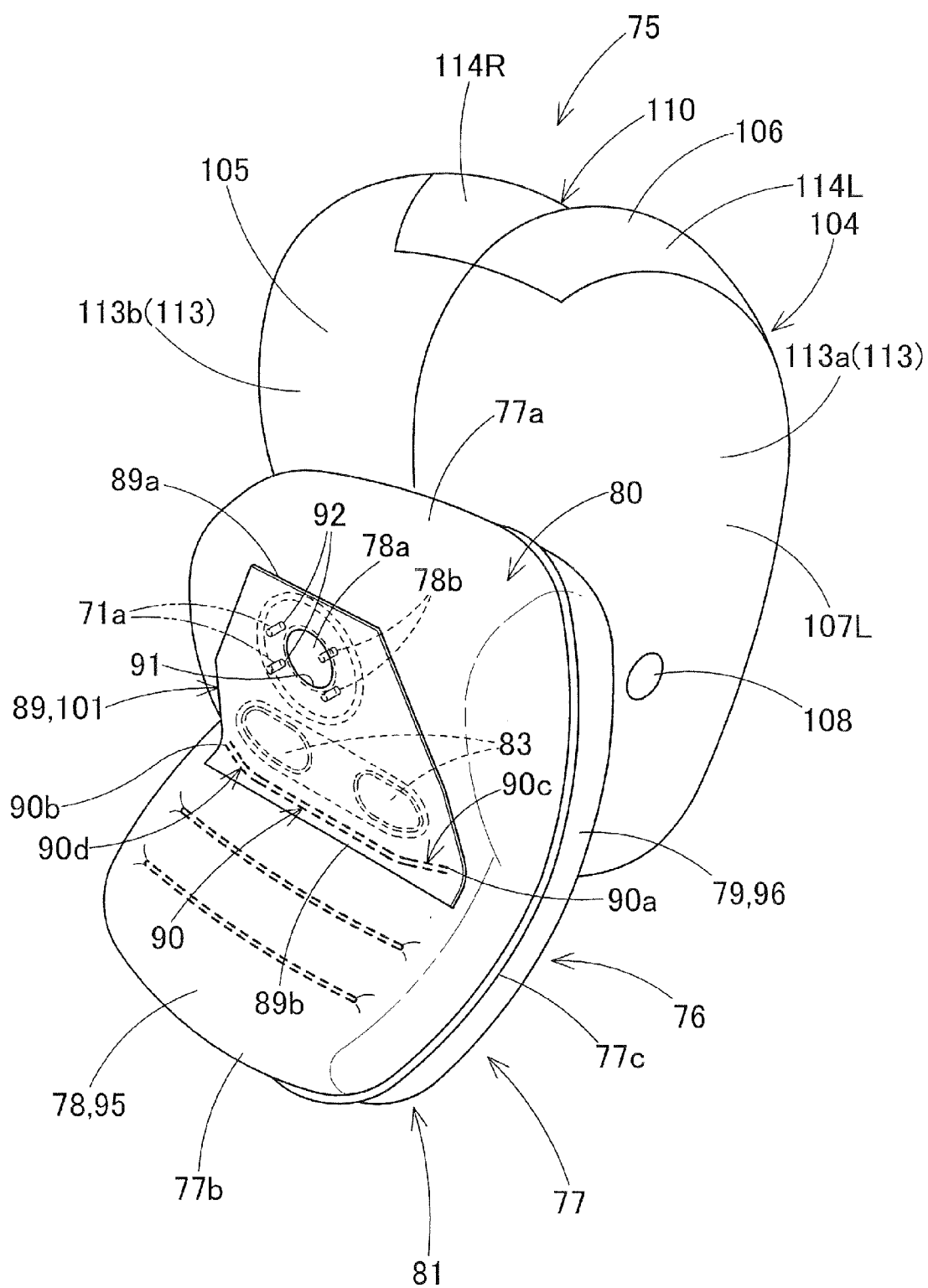
FIG. 17 is a perspective view of an airbag for use in the airbag apparatus of FIG. 15 as viewed from the front, in an inflated state by itself.
Figure 18:
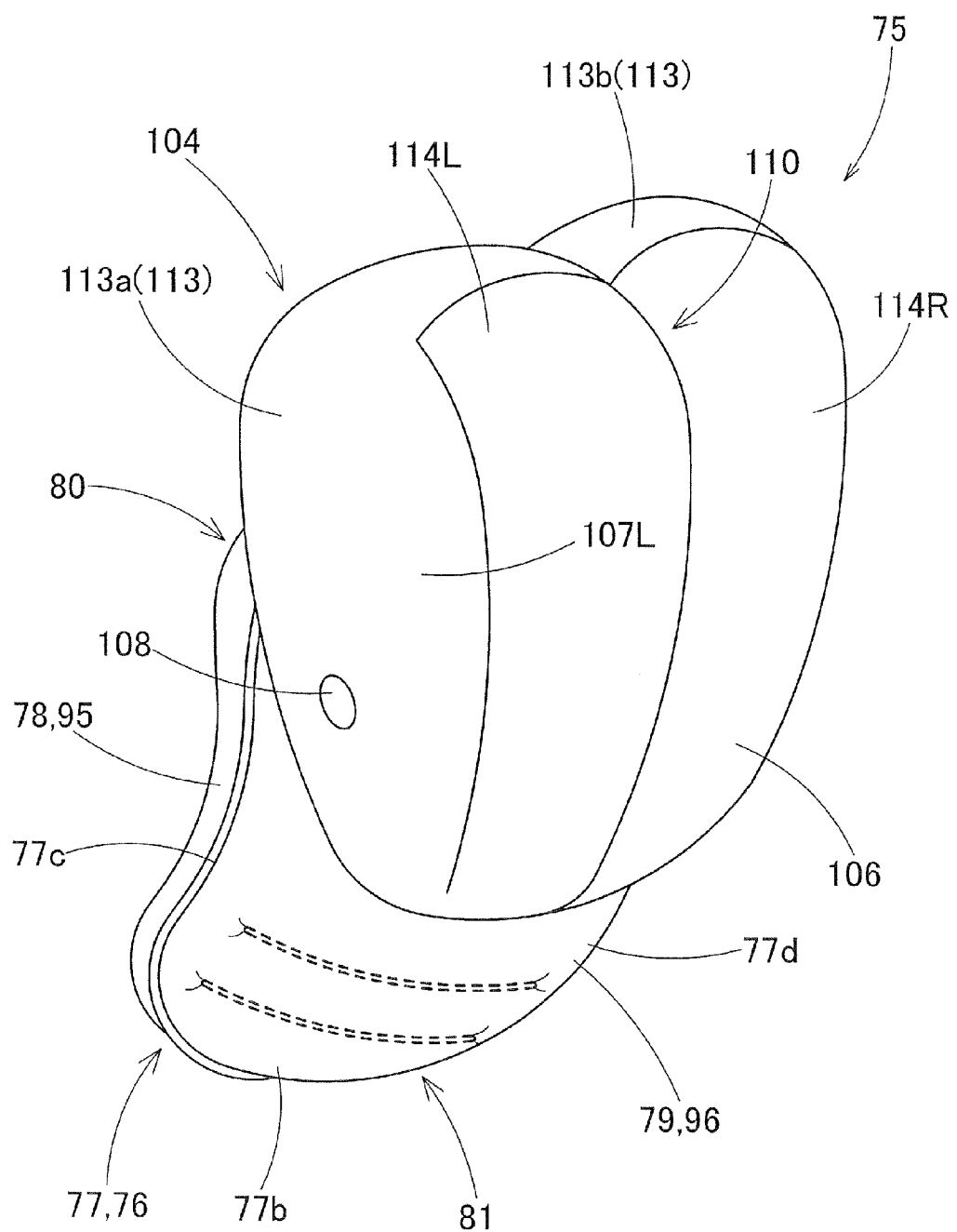
FIG. 18 is a perspective view of the airbag of FIG. 17 as viewed from the rear.
Figure 19:
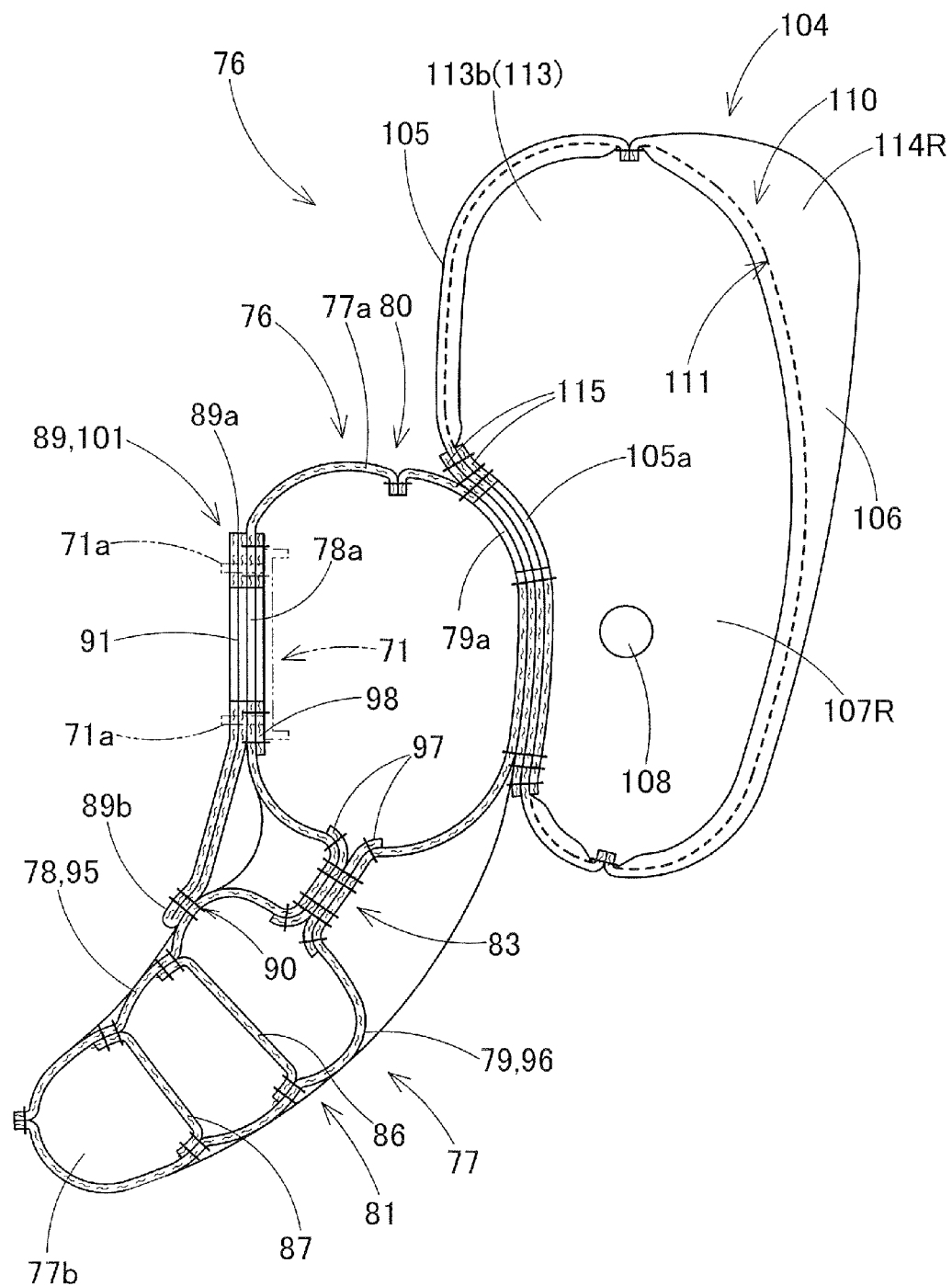
FIG. 19 is a schematic vertical section of the airbag of FIG. 17.

Referring to FIGS. 17 to 19, the airbag 75 includes a knee-protection bag 76 deployable in front of knees K of an occupant MP and an upper protection bag 104 that is coupled with the knee-protection bag 76 and protects an upper body UB of the occupant MP at deployment. As shown in FIGS. 17 and 18, the upper protection bag 104 is connected to a vicinity of the upper end of an occupant side wall 79 of the knee-protection bag 76, and is in gas communication with the knee-protection bag 76 by a communication port 79a formed on the occupant side wall 79 of the knee-protection bag 76. That is, the upper protection bag 104 is fed with an inflation gas via the knee-protection bag 76.

The knee-protection bag 76 includes a bag body 77 inflatable with an inflation gas and an outer connecting element 89 located on the outer surface of the bag body 77. The bag body 77 is designed to emerge from the case 68 and deploy downward between knees K (KL and KR) of an occupant MP and the instrument panel 65 and a glove box 66 located beneath the instrument panel 65 (i.e., a vehicle body structure), so as to cover rear faces 65a and 66a of the instrument panel 65 and glove box 66 from the knees K. As shown in FIG. 15, the instrument panel 65 and glove box 66 are so arranged that an area in the vicinity of a boundary thereof (i.e., a middle area in an up and direction of the instrument panel 65 and glove box 66), which is to be covered by the bag body 77, protrudes rearward and the rear face 66a of the glove box 66 is curved downward and forward such that its lower area is located to the front.

As shown in FIGS. 16, 17 and 19, the bag body 77 includes a mounting region 80 used for mounting to the case 68 and a cushioning region 81 for protecting left and right knees K (KL and KR) of an occupant MP. The mounting region 80 is located on the side of the upper end 77a at full inflation whereas the cushioning region 81 is located on a lower area of the bag body 77. In a flattened and noninflated state, the bag body 77 has a generally rectangular shape elongated in an up and direction and having a generally uniform width in a left and right direction. The bag body 77 is made by connecting (sewing) together peripheral edges of a pair of walls having generally identical contours; a vehicle body side wall 78 deployable toward the instrument panel 65 and an occupant side wall 79 deployable toward the seat.

Figure 22:
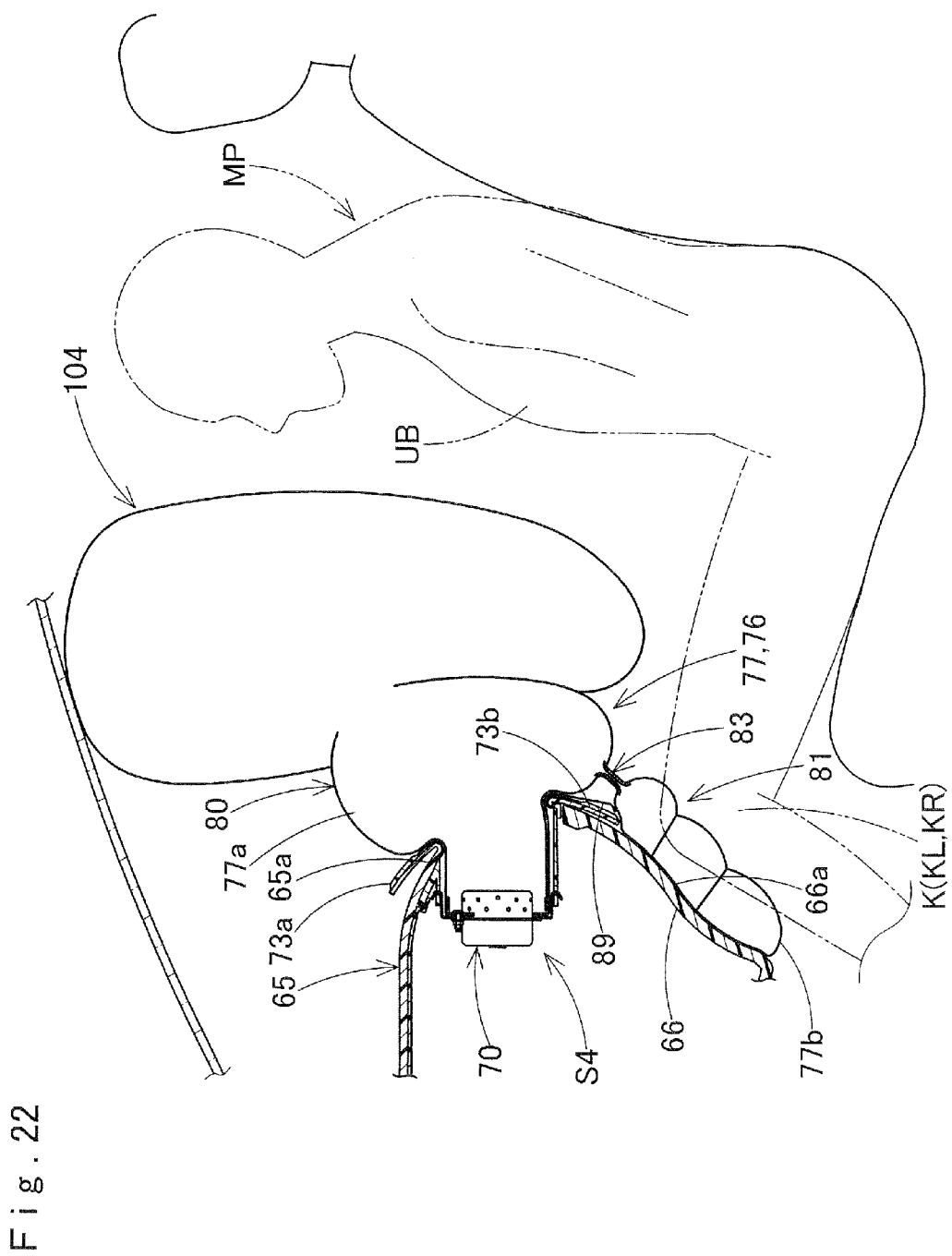
FIG. 22 is a schematic vertical section of the airbag apparatus of FIG. 15 showing the airbag at full deployment.

The mounting region 80 is designed to be deployable outside of the case 68 and cover the rear face 65a of the instrument panel 65 between the instrument panel 65 and upper protection bag 104, as shown in FIG. 22. The mounting region 80 is formed into a generally trapezoidal shape narrowing upward. The cushioning region 81 is identical in a width in a left and right direction to the lower end of the mounting region 80 and continuously extends downward from the mounting region 80. The cushioning region 81 is deployable in front of knees K (KL and KR) of an occupant MP for covering the rear face 66a of the glove box 66. The cushioning region 81 is so sized, in a width in a left and right direction, as to cover front faces of both knees K and so sized, in a dimension in an up and down direction, as to cover front faces of shins of the occupant MP, i.e., as to reach the vicinity of the lower end of the glove box 66.

The vehicle body side wall 78 includes proximate the center in a left and right direction of the area constituting the mounting region 80, i.e., of an upper area of the bag body 77, an inlet opening 78a formed into a circle for receiving the inflator body 70a and mounting holes 78b for receiving the bolts 71a of the retainer 71. The mounting holes 78b are radially arranged along the periphery of the inlet opening 78a. The inlet opening 78a of this specific embodiment is so formed that its center is located on the center in a left and right direction of the vehicle body side wall 78. The occupant side wall 79 includes in the vicinity of the center in a left and right direction on the upper area a communication port 79a that is circular in shape and provides gas communication between the bag body 77 of the knee-protection bag 76 and upper protection bag 104. As shown in FIG. 19, the communication port 79a of this embodiment is not lined up with the inlet opening 78a in an up and down direction, but is located above the inlet opening 78a. Further, in this embodiment, the bag body 77 of the knee-protection bag 76 and upper protection bag 104 are sewn together at the periphery of the communication port 79a. More specifically, the occupant side wall 79 of the bag body 77, which constitutes the periphery of the communication port 79a, and a later-described vehicle body side wall 105 of the upper protection bag 104, which constitutes a periphery of an opening 105a forming the communication port 79a, are sewn together.

The bag body 77 includes above the cushioning region 81 proximate the mounting region 80 thin regions 83 that are formed by approximating the vehicle body wall 78 and occupant side wall 79 thereby remaining thin upon deployment. The thin regions 83 are arranged along a left and right direction in a mutually separate fashion. The bag body 77 of this specific embodiment includes two such thin regions 83. In a similar manner to the bag body 27 of the first embodiment, each of the thin regions 83 is formed by sewing or connecting together the vehicle body side wall 78 and occupant side wall 79 generally in an oval shape so the walls 78 and 79 contact with each other. Moreover, the two thin regions 83 are located on the left and right of the center in a left and right direction of the bag body 77 in a mutually separate fashion, and are also distant from the left and right edges 77c and 77d of the bag body 77. As shown in FIG. 22, the location of the thin regions 83 is such as to be located outside of the case 68 and proximate the lower end of the opening 68c of the case 68, and above knees K (KL and KR) of an occupant MP at full deployment of the bag body 77. That is, the thin regions 83 are located outside of the cushioning region 81. In the bag body 77 as well, the region between the thin regions 83 forms one of gas channels (reference numeral omitted) of an inflation gas directed toward the cushioning region 81 located to the bottom 77b of the bag body 77.

As best shown in FIG. 19, the bag body 77 further includes at the region to the bottom (leading end) 77b under the thin regions 83 tethers 86 and 87 that respectively connect the vehicle body side wall 78 and occupant side wall 79 for limiting the thickness of the bag body 77 at full inflation. The two tethers 86 and 87 are arranged along a generally left and right direction and disposed one above the other in this embodiment.

The outer connecting element 89 is formed into such an outer contour as a flat home plate in which a lower edge 89b is wider, by a sheet material formed by folding a later-described base cloth 101 (FIG. 20) in half. The outer connecting element 89 is connected to the vehicle body side wall 78 by two joints arranged away from each other in an up and down direction; at the vicinities of the upper edge 89a and lower edge 89b. In this specific embodiment, the lower edge 89b of the outer connecting element 89, which is located down the stream of inflation gas, is generally wholly sewn or connected to a region of the vehicle body side wall 78 between the upper tether 86 and thin regions 83 by a stitch 90 which is formed into a generally straight and continuous line extending along a left and right direction. The outer connecting element 89 includes at the upper edge 89a, which is proximate the gas source (inflator 70) upon deployment, a circular insert hole 91 for receiving the inflator body 70a together with the inlet opening 78a of the vehicle body side wall 78 and mounting holes 92 formed around the insert hole 91 for receiving the bolts 71a of the retainer 71. That is, the upper edge 89a of the outer connecting element 89 is attached to the case 68 together with the bag body 77 by the bolts 71a of the retainer 71 that secures the airbag 75 and inflator 70 to the case 68, thereby connected to the vehicle body side wall 78 in such a manner as to be clamped between the retainer 71 and the bottom wall 68a of the case 68. As shown in FIGS. 17 and 19, the thin regions 83 of the bag body 77 are located between the two, upper and lower joints of the outer connecting element 89 to the vehicle body side wall 78, i.e., between the stitch 90 and mounting holes 78b.

Figure 20:
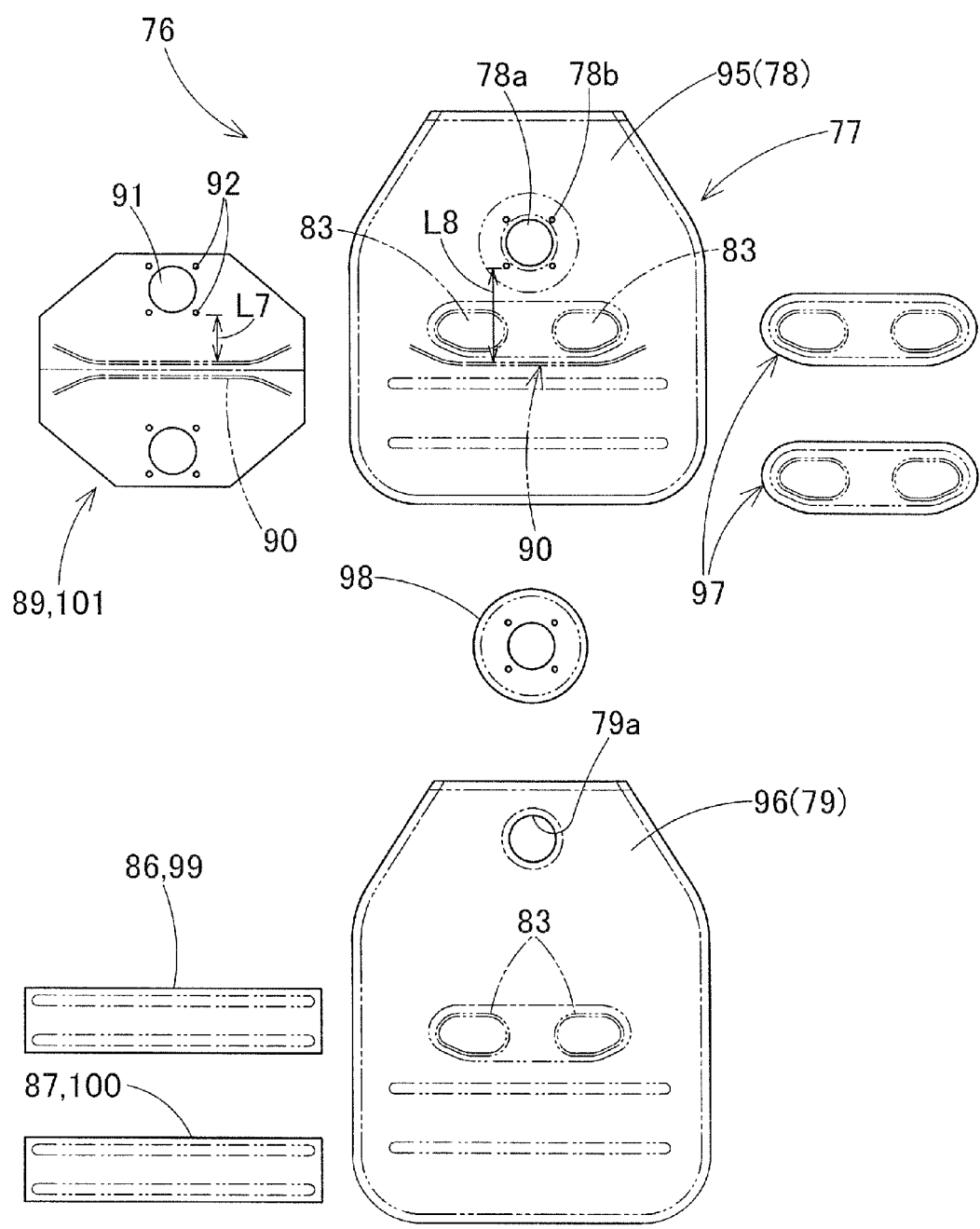
FIG. 20 illustrates base materials of a knee-protection bag of the airbag of FIG. 17 by plan views.

The outer connecting element 89 is provided for reducing a substantial length of the vehicle body side wall 78 in an up and down direction upon deployment compared to that in a flattened and noninflated state. To this end, as shown in FIG. 20, the distance L7 in an up and down direction between the stitch 90 and mounting holes 92 (on the lower side) of the outer connecting element 89 is smaller than the distance L8 in an up and down direction between the location of the stitch 90 and mounting holes 78a (on the lower side) of the vehicle body side wall 78 in a flattened state. Moreover, the stitch 90 that connects the generally entire area of the lower edge 89b of the outer connecting element 89 in a left and right direction to the vehicle body side wall 78 is so formed as to extend outwardly in a left and right direction beyond the mounting holes 92 and 78b (i.e., the bolts 71a of the retainer 71), alike the outer connecting element 45 of the airbag 26. As shown in FIG. 17, end portions 90c and 90d of the stitch 90 are so curved that their terminals 90a and 90b located outside of the mounting holes 92 in a left and right direction are headed upward (i.e., toward the mounting region 80 or up the stream of inflation gas).

The knee-protection bag 76 of this embodiment is formed by sewing together base cloths comprised of a woven fabric of polyamide, polyester or the like and cut in predetermined shapes, using sewing threads. As shown in FIG. 20, the knee-protection bag 76 is comprised of two main base cloths 95 and 96 for forming the vehicle body side wall 78 and occupant side wall 79 of the bag body 77, three reinforcing cloths 97 and 98, two base cloths 99 and 100 for forming the tethers 86 and 87, and a base cloth 101 for forming the outer connecting element 89. As in the first embodiment, the two reinforcing cloths 97 are for reinforcing the area where the thin regions 83 are located. The reinforcing cloth 98 is generally circular in outer contour, and is provided to reinforce the periphery of the inlet opening 78a of the vehicle body side wall 78.

The upper protection bag 104 is designed to deploy upward and cover a rear area of the mounting region 80 of the knee-protection bag 76 extensively in an up and down direction at full inflation. Specifically in this embodiment, the upper protection bag 104 is inflatable into a generally rectangular parallelepiped shape that approximates a front wind shield 67 located above the instrument panel 65 and covers a generally entire front face of an upper body UB (from pelvis to head) of an occupant MP at the rear of the mounting region 80 of the knee-protection bag 76, as shown in FIGS. 17 and 18. Even more specifically, the upper protection bag 104 at full deployment is thickest at an upper end region, i.e., a region deployed in front of the head of the occupant MP. The upper protection bag 104 includes a vehicle body side wall 105 deployable at the front side, an occupant side wall 106 deployable at the rear, i.e., toward an occupant, and a pair of side walls 107L and 107R deployable on the left and right sides. The vehicle body side wall 105 includes proximate the lower end an opening 105a which corresponds to the communication port 79a formed on the occupant side wall 79 of the bag body 77 of the knee-protection bag 76 (FIG. 19). Each of the side walls 107L and 107R is provided with a vent hole 108 for emitting extra inflation gas. As shown in FIGS. 18 and 19, the occupant side wall 106 of this specific embodiment includes a recessed region 110 that is slightly recessed forward and downward at the center in a left and right direction. The recessed region 110 is most recessed in the vicinity of the upper end of the occupant side wall 106 and gradually disappears toward the lower end. The bottom or leading end of the recessed region 110 is comprised of a seam 111 that is formed by sewing inner edges of later-described rear left panel 114L and rear right panel 114R together.

Figure 21:
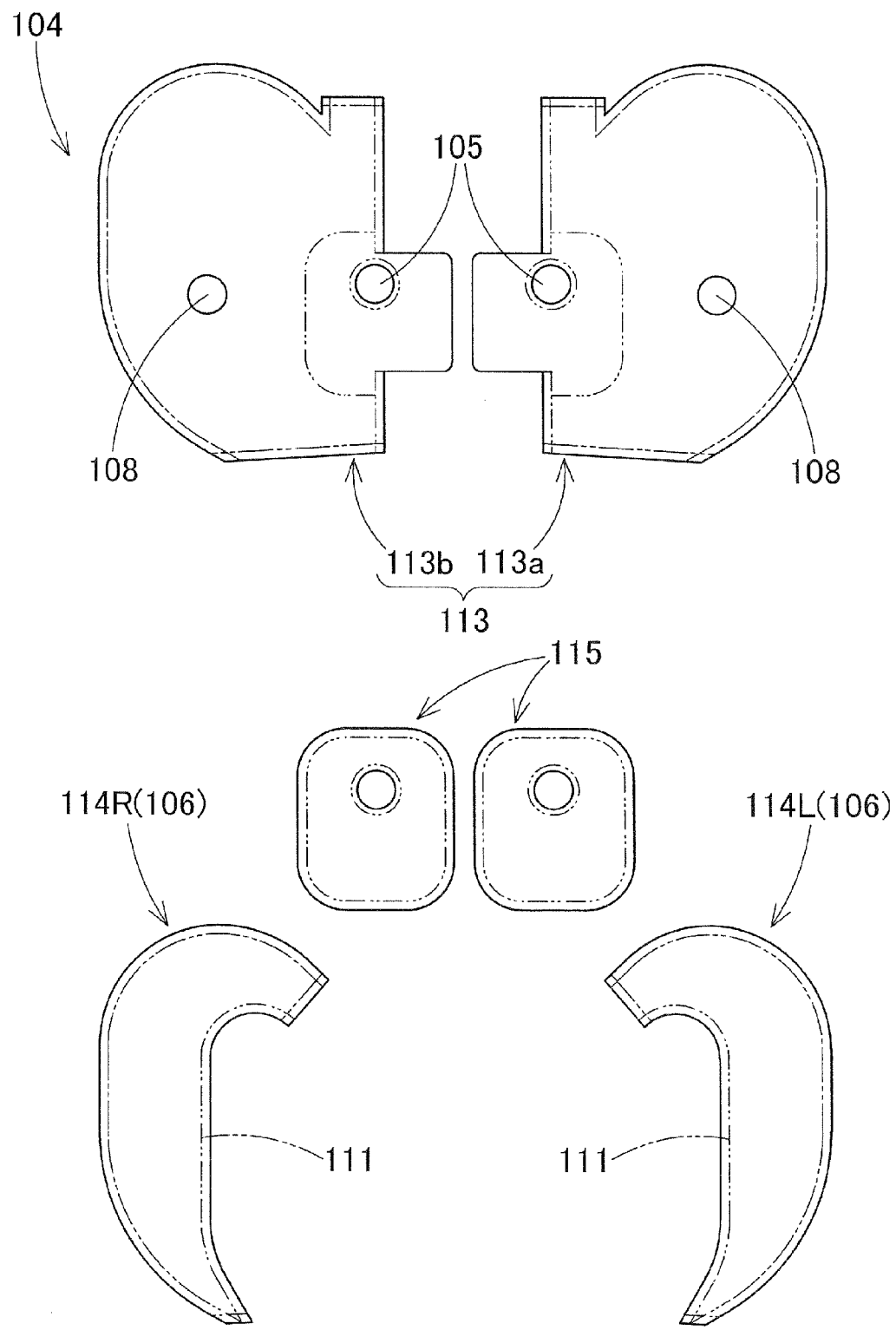
FIG. 21 illustrates base materials of an upper protection bag of the airbag of FIG. 17 by plan views.

The upper protection bag 104 is also formed by sewing together base cloths comprised of a woven fabric of polyamide, polyester or the like and cut in predetermined shapes, using sewing threads. As shown in FIG. 21, the upper protection bag 104 is comprised of a front panel 113 that constitutes the vehicle body side wall 105 and the left and right side walls 107L and 107R, a pair of rear left panel 114L and rear right panel 114R that constitute in combination the occupant side wall 106, and two pieces of reinforcing cloths 115 for reinforcing the periphery of the communication port 79a (i.e., the opening 105a). The front panel 113 of this embodiment is comprised of a left panel 113a forming an area from a left half of the vehicle body side wall 105 to the side wall 107L and a right panel 113b forming an area from a right half of the vehicle body side wall 105 to the side wall 107R.

Manufacturing of the airbag 75 is now described. Firstly, the reinforcing cloth 98 is laid on the inner surface of the main base cloth 95 for forming the vehicle body side wall 78 of the knee-protection bag 76, and sewn to the peripheral area of the inlet opening 78a. First edges in a width direction of the base cloths 99 and 100 are sewn to the inner surface of the main base cloth 95, and the lower edge 89b of the outer connecting element 89 is sewn to the outer surface of the main base cloth 95 with sewing threads, thereby forming the stitch 90. Each of the reinforcing cloths 97 is sewn to the main base cloth 95/96 by the peripheral edge. Subsequently, the left panel 113a and right panel 113b for forming the upper protection bag 104 are overlaid one above the other in an aligning manner with the outer surfaces faced each other and inner edges of the panels 113a and 113b are sewn together, thereby forming the front panel 113. This front panel 113 is unfurled by pulling outer edges of the panels 113a and 113b away from each other and an area around the opening 105a of the left panel 113a and an area around the opening 105a of the right panel 113b are so overlapped as to locate the left panel 113a inside while the right panel 113b outside. Each of the reinforcing cloths 115 is laid over the inner side of the left panel 113a/the outer side of the right panel 113b, and the main base cloth 96 for the occupant side wall 106 of the knee-protection bag 76 is laid over the reinforcing cloth 115 that is located on the outside of the right panel 113b. Then the panels 113a, 113b and main base cloth 96 together with the reinforcing cloths 105 are sewn together at locations of peripheral edges of the communication port 79a (opening 105a) and peripheral edges of the reinforcing cloths 115 by sewing threads, such that the main base cloth 96 (occupant side wall 79) of the knee-protection bag 76 and the front panel 113 (vehicle body side wall 105) of the upper protection bag 104 are coupled together. Thereafter, the communication port 79a (opening 105a) is punched out.

Subsequently, the rear left panel 114L and rear right panel 114R are mated with outer surfaces thereof faced each other and inner edges thereof are sewn together by sewing threads, thereby forming the stitch 111. Then the coupled panels 114L and 114R are opened in a left and right direction so as to locate the stitch 111 at the center in a left and right direction, and remaining edges of the panels 114L and 114R are sewn to corresponding edges of the left panel 113a and right panel 113b, such that the upper protection bag 104 is formed into a bag. Thereafter, the bag 104 is reversed inside out from the communication port 79a (opening 105a) so as to locate seam allowances inside and take out the occupant side wall 79 of the knee-protection bag 76. Thus the upper protection bag 104 is completed.

Thereafter, second edges in a width direction of the base cloths 99 and 100, whose first edges have been sewn to the main base cloth 96, are sewn to the main base cloth 95 for forming the vehicle body side wall 78 of the knee-protection bag 76. Then the main base cloths 95 and 96 are flattened and mated together, and the thin regions 83 are formed by sewing together the main base cloths 95 and 96 with the reinforcing cloths 97 by sewing threads. If then outer peripheral edges of the main base cloths 95 and 96 are sewn together, the knee-protection bag 76 is formed with the lower edge 89b of the outer connecting element 89 connected to the vehicle body side wall 78, and the airbag 75 is completed.

Then the retainer 71 is located inside the bag body 77 such that the bolts 71a protrude out of the mounting holes 78b, and the bolts 71a are put through the mounting holes 92 located proximate the upper edge 89a of the outer connecting element 89 such that the upper edge area 89a of the outer connecting element 89 is temporarily coupled with the vehicle body side wall 78. In this state, the airbag 75 is folded up so as to fit in the case 68 and wrapped up by an unillustrated tearable wrapping sheet for keeping the folded-up configuration. Subsequently, the case 68 is so arranged that the opening 68c faces upward while the bottom wall 68a is located at lower side, and the folded-up airbag 75 is set on the bottom wall 68a of the case 68 such that the bolts 71a pass through the bottom wall 68a. Then the inflator body 70a is set inside the case 68 from the lower side of the bottom wall 68a such that the bolts 71a projecting downward from the bottom wall 68a pass through the flange 70c of the inflator 70. Then if the bolts 71a protruding from the flange 70c of the inflator 70 are fastened with nuts 72, the upper edge area 89a of the outer connecting element 89 is connected to the vehicle body side wall 78 of the bag body 77 in such a manner as to be clamped between the bottom wall 68a of the case 68 and retainer 71 as well as the airbag 75 and inflator 70 are attached to the bottom wall 68a of the case 68.

Subsequently, the joint wall 73c of the airbag cover 73 of the instrument panel 65 which is mounted on the vehicle, is engaged with the circumferential wall 68b of the case 68, and unillustrated brackets of the case 68 is secured to the vehicle body structure. Thus the airbag apparatus S4 is mounted on a vehicle.

After the airbag apparatus S4 is mounted on the vehicle, in the event of a frontal collision, an inflation gas is discharged from the gas discharge ports 70a of the inflator 70. Then the airbag 75 inflates and breaks the wrapping sheet, and pushes and opens the doors 73a and 73b of the airbag cover 73 as shown in FIGS. 16 (double-dashed lines) and 22. Then the airbag 75 emerges from the opening 68c provided by opening of the doors 73a and 73b of the airbag cover 73 and protrudes rearward while unfurling the knee-protecting bag 76 downward and upper protection bag 104 upward. At full deployment, as shown in FIGS. 15 (double-dashed lines) and 22, the airbag 75 covers an entire front face of an occupant MP seated in a front passenger's seat from the knees K to the upper body UB. At this time, the knee-protection bag 76 covers the rear faces 65a and 66a of the instrument panel 65 and glove box 66 in such a manner as to throw the lower end 77b in a clearance between the knees K of the occupant MP and glove box 66, while the upper protection bag 104 deploys generally along an up and down direction beyond the mounting region 80 of the knee-protecting bag 76 at the rear of the mounting region 80.

Also in the airbag apparatus S4 according to the second embodiment of the invention, the bag body 77 of the knee-protection bag 76 includes the thin regions 83 that remain thin upon deployment by keeping the vehicle body wall 78 and occupant side wall 79 approximated. The thin regions 83 will help bend the bag body 77 upon deployment at the location of the thin regions 83. Further, the bag body 77 includes the outer connecting element 89 that is located on the outer face of the vehicle body side wall 78 and connected to the vehicle body side wall 78 by two joints arranged away from each other in an up and down direction at deployment so as to reduce the length in an up and down direction of the vehicle body side wall 78 at deployment, and the thin regions 83 are located between the two joints. Upon deployment, the outer connecting element 89 will pull the lower end region or a region to the leading end 77b of the bag body 77 toward the case 68 to which the opposite end of the bag body 77, i.e., the mounting region 80, is secured, such that the bag body 77 will deploy in a bowing fashion with the lower end 77b oriented toward the glove box 66 as part of the vehicle body structure. Moreover, the thin regions 83 are arranged generally along a left and right direction of the bag body 77 in a mutually separate manner. This configuration will help bend the bag body 77 at the location of the thin regions 83 in a steady fashion in a wide range in a left and right direction. Additionally, the separate arrangement of the thin regions 83 will allow an inflation gas flown into the mounting region 80 to pass through the area between the thin regions 83 and flow into the cushioning region 81, i.e., the area of the bag body 77 ranging from the thin regions 83 to the lower end (leading end) 77b, thereby helping inflate the whole bag body 77 quickly. As a result, the airbag apparatus S4 of the second embodiment will be capable of deploying the knee-protection bag 76 so the bag 76 covers the rear face 65a of the instrument panel 65 and the rear face 66a of the glove box 66 smoothly and quickly even if the instrument panel 65 and glove box 66 form such a curved shape that a middle region thereof in an up and down direction protrudes rearward.

Therefore, the airbag apparatus S4 of the second embodiment is capable of deploying the knee-protection bag 76 along the curved rear faces 65a and 66a of the instrument panel 65 and glove box 66 smoothly for steady protection of knees K of an occupant MP.

In the second embodiment, too, since the thin regions 83 are located above, i.e., out of, the cushioning region 81 for protecting knees K (KL and KR) of an occupant MP, the cushioning region 81 will be allowed to secure enough thickness, and the cushioning region 81 inflated in a thick and wide fashion will cushion the knees K softly.

Moreover, since each of the thin regions 83 of the airbag apparatus S4 is also made by stitching (connecting) the vehicle body side wall 78 and occupant side wall 79 together into a generally oval shape, the thin regions 83 remain very thin upon airbag deployment, so that the bag body 77 can bend smoothly at the location of the thin regions 83 upon deployment of the airbag 75. Further, in the second embodiment, too, the two separate thin regions 83 are formed at such locations that are laterally symmetrical relative to the center in a left and right direction of the bag body 77 and are distant from the left and right edges 77c and 77d of the bag body 77. This configuration provides three gas channels that feed an inflation gas to the area to the leading end (bottom) 77b of the bag body 77 (i.e., to the cushioning region 81); at the sides of the left and right edges 77c and 77d and generally at the center in a left and right direction (i.e., between the thin regions 83), of the bag body 77, thereby quickly inflating a central area in a left and right direction of the bag body 77 as well as left and right areas. Accordingly, the bag body 77 is capable of inflating quickly generally over an entire area in a left and right direction in a balanced fashion.

Also in the second embodiment, the outer connecting element 89 is secured to the vehicle body side wall 78 by the area proximate the upper edge 89a when the bolts 71a of the retainer 71 housed in the mounting region 80 attach the upper edge 89a area to the case 68 together with the bag body 77. With this configuration, the lower edge 89b of the outer connecting element 89 has only to be connected (sewn) to the vehicle body side wall 78 of the bag body 77 when manufacturing the airbag 75. This will facilitate the manufacturing of the airbag compared to an instance where both of the upper edge and lower edge of the outer connecting element are connected to the vehicle body side wall with sewing threads or the like.

In the second embodiment, too, the joint that connects the area of the outer connecting element 89 proximate the lower edge 89b to the vehicle body side wall 78 is comprised of the stitch 90 that extends outwardly in a left and right direction beyond the bolts 71a of the retainer 71 for mounting the upper edge region 89a to the vehicle body side wall 78. That is, the stitch 90 is greater in a width in a left and right direction than that of the joint on the side of the upper edge 89a located up the stream of inflation gas (i.e., than a distance between the bolts 71a of the retainer 71). However, the left and right end portions 90c and 90d of the stitch 90 are so curved that their terminals 90a and 90b are headed up the stream of the inflation gas, i.e., toward the mounting region 80. This configuration will shorten the distances from the terminals 90a and 90b of the stitch 90 to the bolts 71a and enable the outer connecting element 89 to pull the vehicle body side wall 78 generally uniformly toward the case 68 by the generally entire area in a left to right direction at an initial stage of inflation of the bag body 77. Therefore, the bag body 77 is capable of deploying along the rear faces 65a and 66a of the instrument panel 65 and glove box 66 quickly and steadily by its generally entire area in a left and right direction.

What is claimed is:

1. An airbag apparatus comprising:
a housing adapted to be located in front of a seat of the vehicle; and
an airbag for knee protection, made of a flexible material and housed in the housing in a folded-up state for emergence from the housing and deployment between a member of a vehicle body structure and knees of a vehicle occupant when fed with an inflation gas by an inflator, so as to cover a rear face of the member of the vehicle body structure which is so curved that a middle region of the member in an up and down direction protrudes rearward, the airbag including:
a bag body formed by connecting peripheral edges of a pair of walls that are generally identical in outer contour, the walls being a vehicle body side wall deployable toward the vehicle body structure and an occupant side wall deployable toward the seat;
an outer connecting element that is located on an outer face of the vehicle body side wall and connected to the vehicle body side wall by two joints arranged away from each other in an up and down direction at deployment for reducing a substantial length in an up and down direction of the vehicle body side wall at deployment compared to that in a flattened and noninflated state;
a mounting region to the housing, located on either an upper or a lower end region of the bag body; and
a plurality of thin regions that are formed by connecting together the vehicle body side wall and occupant side wall so as to remain thin even at airbag inflation, the thin regions being arranged generally along a left and right direction in a mutually separate fashion in an area of the bag body between the two joints of the outer connecting element to the vehicle body side wall, thereby helping bending of the airbag at deployment,
wherein:
the mounting region is located at the lower end region of the bag body such that the bag body is deployable upward after emerging from the housing mounted at a low site in front of the knees;
a cushioning region for cushioning the knees is located in an upper area of the bag body, the cushioning region being greater in width in the left and right direction than the mounting region, such that the bag body in a flattened and noninflated state has a shape like a home plate; and
the thin regions are located in an area with a narrower width when compared to the cushioning region and also below the cushioning region,
the outer connection element is set with a width in the left and right direction greater than that of the housing at least at an area of the housing located downstream of the inflation gas,
a first joint, out of the two joints of the outer connecting element to the vehicle body side wall, is located more proximate to the inflator at airbag deployment,
a second joint, out of the two joints of the outer connecting element to the vehicle body side wall, is located more away from the inflator at airbag deployment, and
the second joint is comprised of a stitch that is formed into a continuous line extending generally along the left and right direction, the stitch is greater a width in the left and right direction than the first joint, the second joint extends outwardly beyond the first joint in the left and right direction, the stitch includes opposite end portions and a generally straight middle portion, and the opposite end portions of the stitch are so curved that their terminals are headed up the stream of the inflation gas.

2. The airbag apparatus of claim 1, wherein:
each of the thin regions is made by connecting the vehicle body side wall and occupant side wall in such a manner as to bring the walls into contact with each other; and
the thin regions are formed at such locations that are laterally symmetrical relative to a center in a left and right direction of the bag body and are distant from left and right edges of the bag body.

3. The airbag apparatus of claim 2 wherein the number of the thin regions is two.

4. The airbag apparatus of claim 3 wherein each of the thin regions is formed by connecting the vehicle body side wall and occupant side wall in a generally oval shape.

5. The airbag apparatus of claim 1, wherein:
the inflator includes a plurality of mounting members arranged in a left and right direction for mounting on the housing and is housed inside the bag body such that the mounting members protrude out of the vehicle body side wall; and
the first joint is formed by securing an upper end region of the outer connecting element to the housing together with the bag body by the mounting members of the inflator.

6. The airbag apparatus of claim 1 further including on an area to a leading end of the bag body relative to the thin regions a tether that connects the vehicle body side wall and occupant side wall for limiting a thickness of the bag body at full inflation, the tether being arranged generally along a left and right direction, wherein
in a flattened and noninflated state of the vehicle body side wall and occupant side wall, a distance in an up and down direction on the vehicle body side wall from an end on the side the mounting region is located to a joint with the tether is smaller than a distance in an up and down direction on the occupant side wall from an end on the side the mounting region is located to a joint with the tether.

7. The airbag apparatus of claim 1 wherein the housing has an opening for allowing airbag emergence at a bottom thereof in a on-board state such that the apparatus is mountable proximate a lower end of the member of vehicle body structure.

8. The airbag apparatus of claim 1 further including an upper protection bag for protecting an upper body of the occupant, the upper protection bag being connected to and in gas communication with the airbag for knee protection for deploying upward from the housing mounted in front of and above the knees of the occupant seated in a front passenger's seat,
wherein the mounting region of the airbag for knee protection is located at the upper end region of the bag body such that the airbag for knee protection is deployable downward from the housing.

* * * * *